United States Patent
Taylor, III et al.

(10) Patent No.: US 9,912,648 B2
(45) Date of Patent: Mar. 6, 2018

(54) TWO-FACTOR AUTHENTICATION WITH PUSH NOTIFICATION FOR A SECURITY CODE

(71) Applicant: Square, Inc., San Francisco, CA (US)

(72) Inventors: Jotham M. Taylor, III, Berkeley, CA (US); Daniel S. Federman, San Francisco, CA (US)

(73) Assignee: SQUARE, INC., San Francisco, CA (US)

(*) Notice: Subject to any disclaimer, the term of this patent is extended or adjusted under 35 U.S.C. 154(b) by 808 days.

(21) Appl. No.: 14/332,169

(22) Filed: Jul. 15, 2014

(65) Prior Publication Data
US 2016/0019543 A1   Jan. 21, 2016

(51) Int. Cl.
| | | |
|---|---|---|
| G06K 15/00 | (2006.01) | |
| H04L 29/06 | (2006.01) | |
| G06Q 20/32 | (2012.01) | |
| G06Q 20/40 | (2012.01) | |
| G06Q 20/42 | (2012.01) | |
| G06F 21/42 | (2013.01) | |
| H04L 12/58 | (2006.01) | |

(52) U.S. Cl.
CPC .............. *H04L 63/08* (2013.01); *G06F 21/42* (2013.01); *G06Q 20/32* (2013.01); *G06Q 20/40* (2013.01); *G06Q 20/4014* (2013.01); *G06Q 20/42* (2013.01); *H04L 63/083* (2013.01); *H04L 63/0853* (2013.01); *H04L 51/00* (2013.01)

(58) Field of Classification Search
CPC ............ G06K 15/00; G06K 5/00; G06K 7/01; G06K 19/00; G06F 17/00
USPC ...................... 235/383, 382, 382.5, 375, 487
See application file for complete search history.

(56) References Cited

U.S. PATENT DOCUMENTS

2007/0050840 A1* 3/2007 Grandcolas ............. G06F 21/42
726/5
2011/0159846 A1   6/2011 Kemshall
(Continued)

FOREIGN PATENT DOCUMENTS

WO   2014/087179 A1   6/2014

OTHER PUBLICATIONS

International Search Report and Written Opinion for PCT Application No. PCT/US2015/40601, dated Sep. 25, 2015.

*Primary Examiner* — Edwyn Labaze
(74) *Attorney, Agent, or Firm* — Mattingly & Malur, PC

(57) ABSTRACT

Disclosed is a technology for password-free account authentication. The technology includes utilizing a mobile device running an application ("App") associated with a payment service (PS) system. Using the App, a user can enter an addressable handle, which is transmitted to the PS system. The PS system identifies an account state, based on the receipt of the addressable handle, for example, whether the addressable handle corresponds to a user's system account and device. A first authentication factor is based on the knowledge that the user is in possession of and has access to a device that corresponds to the user and the addressable handle. The PS system pushes a notification to the corresponding device, based on the account state, prompting entry of a security code. Receipt of a security code that corresponds to a payment card linked to the user's system account serves as a second authentication factor.

27 Claims, 18 Drawing Sheets

(56) References Cited

U.S. PATENT DOCUMENTS

| | | | |
|---|---|---|---|
| 2012/0185398 A1* | 7/2012 | Weis | G06Q 20/20 705/75 |
| 2012/0303425 A1* | 11/2012 | Katzin | G06Q 20/027 705/14.4 |
| 2013/0139222 A1* | 5/2013 | Kirillin | H04L 67/02 726/4 |
| 2013/0275308 A1 | 10/2013 | Paraskeva et al. | |
| 2014/0074717 A1 | 3/2014 | Evans | |
| 2014/0156531 A1 | 6/2014 | Poon et al. | |
| 2014/0164154 A1* | 6/2014 | Ramaci | G06Q 20/3674 705/16 |

* cited by examiner

TWO-FACTOR AUTHENTICATION WITH PUSH NOTIFICATION FOR A SECURITY CODE

FIELD OF THE INVENTION

At least one embodiment of the present invention pertains to systems and technologies that perform remote authentication, and more particularly, to a technology for providing authentication during a log-in process.

BACKGROUND

There is an ever increasing need for people to establish and maintain accounts online. Remote user access to an online system, account or website usually requires the establishment and use of both a user name and a password. A conventional log-in requires two factors of authentication, based on the user name and the password.

Users are therefore required to manage and remember or in some way securely retain a large number of passwords.

It is common wisdom that users should maintain unique passwords for each of their accounts, and change them often, such as based on time or perceived security threats. As well, it is desired that online passwords be reasonably complex, to improve protection from hacking.

Users often forget a password for one of their accounts, which requires that they take the time to reestablish a new password, often by sending a request, and/or by answering security questions, for which they have previously provided answers, and for which they often have also forgotten.

Furthermore, the sheer number of passwords, along with their complexity and shelf life, is problematic, and even knowledgeable users often fail to update their passwords in a timely manner, and often use the same password for different accounts.

Online passwords are therefore very time-consuming and inefficient, from the perspective of the user, who may be in a hurry to access a system, website, or account.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
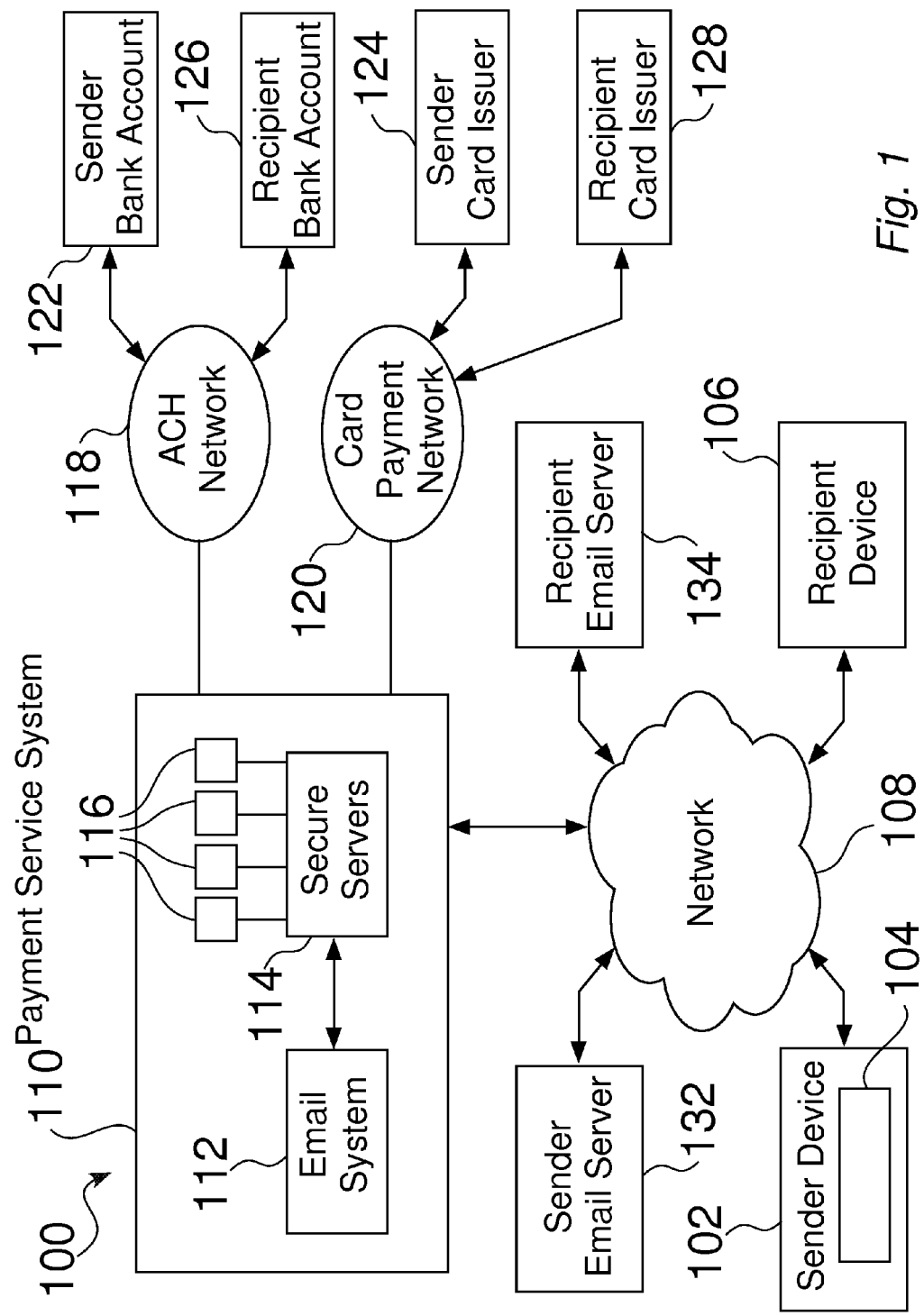
FIG. 1 is a block diagram illustrating an embodiment of a payment service (PS) system for transferring money over email, wherein the PS system provides two factors of authentication with push notification.

References in this description to "an embodiment", "one embodiment", or the like, mean that the particular feature, function, structure or characteristic being described is included in at least one embodiment of the technologies introduced here. Occurrences of such phrases in this specification do not necessarily all refer to the same embodiment. On the other hand, the embodiments referred to also are not necessarily mutually exclusive.

In the following description, the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Technology is disclosed for enabling secure user access to a payment system that eliminates the need to enter a password. The disclosed technology leverages other readily available information that is known, or can be determined during an authentication method.

The technology is not limited to use with payment cards or even to financial systems. Rather, the technology can be employed to provide secure access to any system that traditionally would be initiated by or involve the entry of a password. Note also that as used herein, while the term "user" generally refers to a person that is directly associated with a system account, e.g., an account holder, the technology can alternately be used to provide system access for a person other than the account holder, such as based on authentication provided through both the primary user and their proxy.

In some embodiments, the disclosed technology includes the following actions to authenticate a user, as described more fully below. Initially, a user enters their addressable handle into an Internet browser or other application ("App") on a mobile device, wherein the addressable handle is transmitted to a payment service (PS) system to begin a log-in process, without entry of a password. The PS system identifies an account state, e.g., based on receipt of an addressable handle. For example, if a received addressable handle is found to match that of a user system account and a corresponding device, a first factor in authentication of the user is achieved, based on the knowledge that the user U is in possession of and has access to a device that corresponds to the user U and the addressable handle.

The PS system transmits, e.g., pushes, a notification to the corresponding device based on the account state, wherein the notification can comprise a prompt for a card security code that is associated with a user financial account that is known to the PS system, e.g. a debit account, credit account, a fleet account, or a gift account.

Upon receipt of the security code, the PS system tests the security code by sending an authorization request, with the received security code, to an entity associated with the user financial account. If the security code is verified as matching that of the user's financial account, the entity associated with the user financial account sends an authorization approval to the PS system, thus providing a second factor in authentication, whereby the user can be verified and granted access to their user system account. The user can view or control settings through the accessed user system account, and/or can initiate a monetary transaction from the user financial account, which can be authorized by the PS system.

FIG. 1 is a block diagram illustrating an embodiment of a payment service (PS) system 110 for transferring money over email, wherein the PS system 110 provides two factors of authentication with push notification. The environment 100 includes a mobile computing device 102 (hereinafter "mobile device 102") of a user U (also referred to as "customer" or "consumer"). The mobile device 102 can be, for example, a smart phone, tablet computer, notebook computer, or any other form of mobile processing device 102. Other wired or wireless devices 102 may also be associated with the user U. An application 104 typically runs on the user's mobile device 102. The environment 100 also includes a computer system 110 of a payment service (hereinafter "PS system 110"). The aforementioned PS system 110 can include one or more distinct physical computers and/or other processing devices, e.g., 1800 (FIG. 18) which, in the case of multiple devices, can be connected to each other through one or more wired and/or wireless networks. All of the aforementioned devices are coupled to each other through an internetwork 108, which can be or include the Internet and one or more wired or wireless networks, e.g. a Wi-Fi network and/or a cellular telecommunications network.

The components of the PS system 110 shown in FIG. 1 illustrate an environment 100 that can be used to transfer money via a messaging system, such as email or short message service (SMS), for a user U that is authenticated by the PS system 110. While some examples in this application utilize email as the messaging service, any service that supports sending messages between users and/or devices can be utilized. The PS system 110 can use a messaging service to have money transferred over bank account or debit card networks. The overall system environment 100 includes the sender device 102, e.g. a desktop computer or mobile device, connected to a network, e.g. the Internet 108. The sender device 102 is a computing device capable of running a messaging application 104, such as an application for sending email or SMS messages. For example, the sender device 102 can be a smartphone, a tablet, a desktop computer, a laptop computer, or other data processing apparatus. The recipient device 106 shown in FIG. 1 is also a computing device connected to the Internet 108. The recipient device 106 can be a mobile device, e.g. a smartphone, tablet, or other portable data processing apparatus, or can be a desktop computer, or some other data processing apparatus. A sender user can use the sender device 102 to send, through a sender message server 132, a message to a recipient device 106 and/or recipient bank account 126 to transfer money via a messaging service. The recipient device 106 can receive the message through the recipient message server 134, which provides the message for display on the recipient device 106, e.g. using standard messaging protocols, such as Simple Mail Transfer Protocol (SMTP) for email messages or SMS for text messages and/or instant messaging.

A payment processor operates the payment service (PS) system 110, to process transfers conducted between the sender devices 102 and recipient devices 106. The sender device 102 can send a message to the recipient device 106 and a copy to the PS system 110, e.g. the PS system 110 is carbon copied (CC'ed) on the email. The PS system 110 can, based on the message, transfer money from a sender financial account 122 to a recipient bank account 126, and can communicate with the sender and recipient devices 102 and 106, respectively, using a message system 112, e.g. a mail server operating under SMTP, a text message server that supports SMS, etc. The PS system 110 includes one or more servers 114, at least some of which can handle secure transactions (e.g. using a secure server 114), to process some or all messages exchanged between the sender and recipient devices 102 and 106, respectively. In general, servers 114 can store public merchant information such as the merchant's address or phone number. The servers 114 also handle secure information such as credit card numbers, bank accounts, user system accounts 116, e.g. user identifying or profile information, debit card numbers, and/or other sensitive information.

Each user system account 116 can be associated with one or more financial accounts 208 (FIG. 2), e.g. debit or credit card accounts, of the user. A financial account 208 can be managed by a card issuer, such as the sender card issuer 124 or the recipient card issuer 128, and can be associated with a card number. In some embodiments, information pertaining to one or more financial accounts 208 are stored at the secure server 114. Generally, card issuers, such as sender card issuer 124 and recipient card issuer 128, issue a physical payment card 210 for each account that is a card account. The technology disclosed herein can be used for financial or payment accounts 208 other than debit and/or credit accounts.

The PS system 110 can communicate with a computer system of a card payment network 120, e.g. a debit card payment network such as STAR or PULSE, or a credit card payment network 120 such as Visa's VisaNet Payment system or MasterCard's BankNet network, etc. The PS system 110 can communicate with a computer system of card payment network 120 over the same network 108 used to communicate with the sender device 102, or over a different network. The computer system of the card payment network 120 can communicate in turn with a computer system of a sender card issuer 124, e.g. a bank, and a computer system of a recipient card issuer 128. The sender card issuer 124 and the recipient card issuer 128 can transfer money, e.g. over a debit payment network, in response to a request to transfer money from the PS system 110.

In some embodiments, the PS system 110 can communicate with a computer system of the Automated Clearing House (ACH) network 118. The computer system of the ACH network 118 can communicate with a sender bank account 122 and a recipient bank account 126. The sender bank account 122 and the recipient bank account 126 can transfer money, e.g. using the ACH network 118, such as in response to a request to transfer money from the PS system 110. There can also be computer systems of other entities, e.g. the card acquirer, between the PS system 110 and the card issuers, and between the PS system 110 and the bank accounts.

Eventually, to receive funds from the transfer, the recipient needs to provide financial account information sufficient to receive funds to the PS system 110. For example, in the case of a bank account, the recipient can provide the bank account number and routing number. The recipient's financial account can also be associated with a debit card account, an automated teller machine (ATM) card account, a credit card account, or another third party financial account. In addition, in some embodiments, if the recipient has not entered the financial account information, the payment processor can hold the received funds until the financial account information is provided.

To transfer money between the sender and the recipient, the PS system 110 can operate as a gateway or a middleman. To operate as a gateway, the PS system 110 can identify accounts, e.g. stored at the secure servers 114, for both the sender and the receiver. The PS system 110 can submit a request to an appropriate financial institution to transfer the money. For example, when the financial account to be used for the transfer payment is a card account, the request can be submitted to the sender's card issuer or to the receiver's card issuer, and the request can be sent over existing debit channels. i.e., debit rails. For example, a debit card network can receive the request and can carry out the request to transfer money. The appropriate card issuer 124 can receive and process the request by transferring money to the appropriate account.

To operate as a middleman, the PS system 110 can receive a payment amount for an account, e.g. a credit card account or a debit card account, of the sender, and can hold the payment amount. The PS system 110 can push the payment amount, e.g. over debit rails, to a debit account of the recipient. Instead of holding the payment amount, the PS system 110 can also forward the payment once the recipient links an account with the PS system 110. Alternatively, the PS system 110 can generate a transaction using ACH 118 that debits an amount from the sender bank account 122 and can credit the amount into a recipient bank account 126, e.g. using ACH 118, or onto a debit account, e.g. over debit rails, of the recipient.

Figure 2:
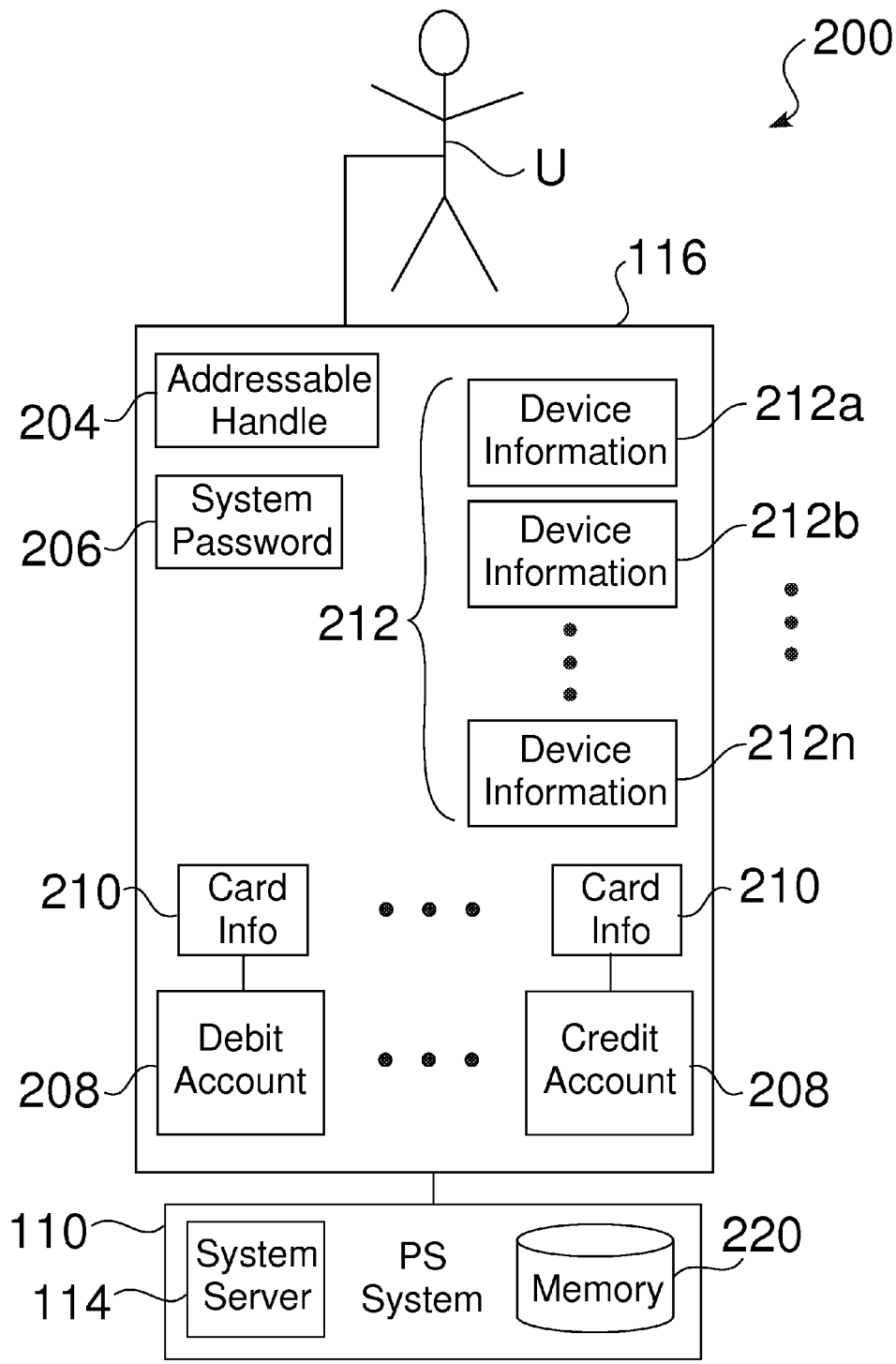
FIG. 2 is a schematic block diagram of user assets associated with a user system account within a PS system.

FIG. 2 is a schematic block diagram 200 of assets associated with a user system account 116 within a PS system 110. For example, when a user U initially establishes a user system account 116 with a PS system 110, the user U can provide an addressable handle 204, i.e. a unique user identifier that can be communicated with, such as an email address, a user name, a phone number, a Facebook ID, a Google+ ID, or any unique identifier to which notifications 702 (FIG. 7) can be routed, and the PS system 110 can prompt the user U to establish a system password 206.

Additionally, the user U links or establishes one or more financial accounts 208, such as debit accounts, credit accounts, or other payment accounts, with the PS system 110. Card information 210 is typically associated with each financial account 208, wherein the information 210 for each of the corresponding payment cards includes a unique card number, and an expiration date.

Security codes are also associated with cards that correspond to a financial account 208. For example, a security code can comprise any of a card identification number (CID), a card security code (CSC), a card verification code (CVC), card verification data (CVD), a card verification number (CVN), or a card verification value (CVV).

For security codes that are associated with cards corresponding to a user financial account 208, the illustrative authentication technologies are disclosed here with respect to payment service systems 110 that do not store the security codes, such as based on security obligations. However, other embodiments of the authentication technologies can be configured to store security codes, such as for retrieval and matching during authentication.

As also seen in FIG. 2, a user U may interact with the PS system 110 through one or more devices 102, such as through a browser or through a native application 104 that is associated to the PS system 110. The PS system 110 typically stores 220 identifying information 212, e.g. 212a-212n for the devices 102.

The two-factor authentication system and method leverages the information known about the user U, to enable convenient and secure system access 420 (FIG. 4), without requiring the entry of a system password 206.

Figure 3:
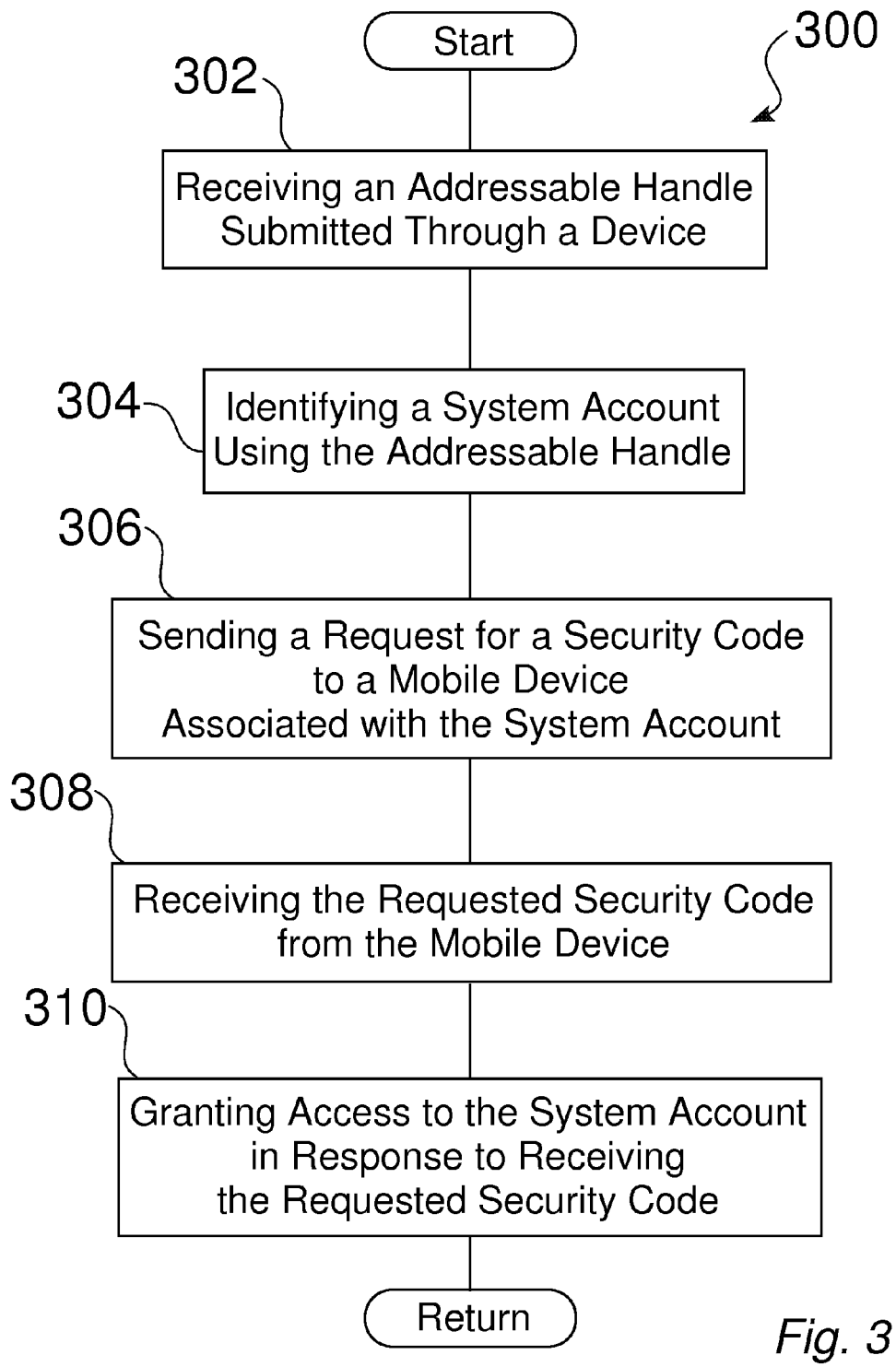
FIG. 3 is a flowchart of an illustrative method for providing two factor authentication with push notification.

FIG. 3 is a flowchart of an illustrative method 300 for providing two factor authentication with push notification. The PS system 110 receives 302 an addressable handle 204 input from or otherwise specified by a user U at a device 102, such as input through a website or native application 104. The PS system 110 then determines or otherwise decides 304 if the received addressable handle 204 corresponds to an existing user system account 116. Additionally, the PS system 110 can determine 604 (FIG. 6) an account state 1102 (FIG. 11) for the user U. For example, for a user U that has previously established a user system account 116, the PS system 110 can determine the identity of the user U who is associated with the addressable handle 204, and identify one or more devices 102 that correspond to the user U. As well, the PS system 110 typically identifies the device 102 through which the addressable handle 204 has been transmitted, and confirms 1702 (FIG. 17) whether that device 102 has previously been associated with the user U and corresponding user system account 116.

In the illustrative method 300 seen in FIG. 3, the PS system 110 causes or otherwise sends 306, i.e. pushes, a notification 702 (FIG. 7) to a mobile device 102 that corresponds to the user system account 116, wherein the mobile device 102 may preferably comprise the device 102 through which the addressable handle 204 was received 302, if that device 102 is known by the PS system 110 to be associated with the user system account 116. The pushed notification 702 typically comprises a request for the user U to provide a security code, e.g. a CVV, which corresponds to a card 210 for a financial account 208 that is associated with the user U.

As further seen in FIG. 3, the PS system 110 grants 310 access to the user system account 116, upon receipt 308 and verification of the correct security code.

The illustrative authentication method 300 seen in FIG. 3 requires two authentication factors, wherein the first authentication factor comprises knowledge by the PS system 110 of the possession and access to a device 102 that is associated with the addressable handle 204, e.g. an email address, that is received at the PS system 110, and wherein the second authentication factor comprises a second information value, e.g. a security code, which corresponds to a financial account 208 that is associated with the user U, wherein receipt of the second information value is responsive to a request 702 that is sent from the PS system 110 to the mobile device 102.

Figure 4:
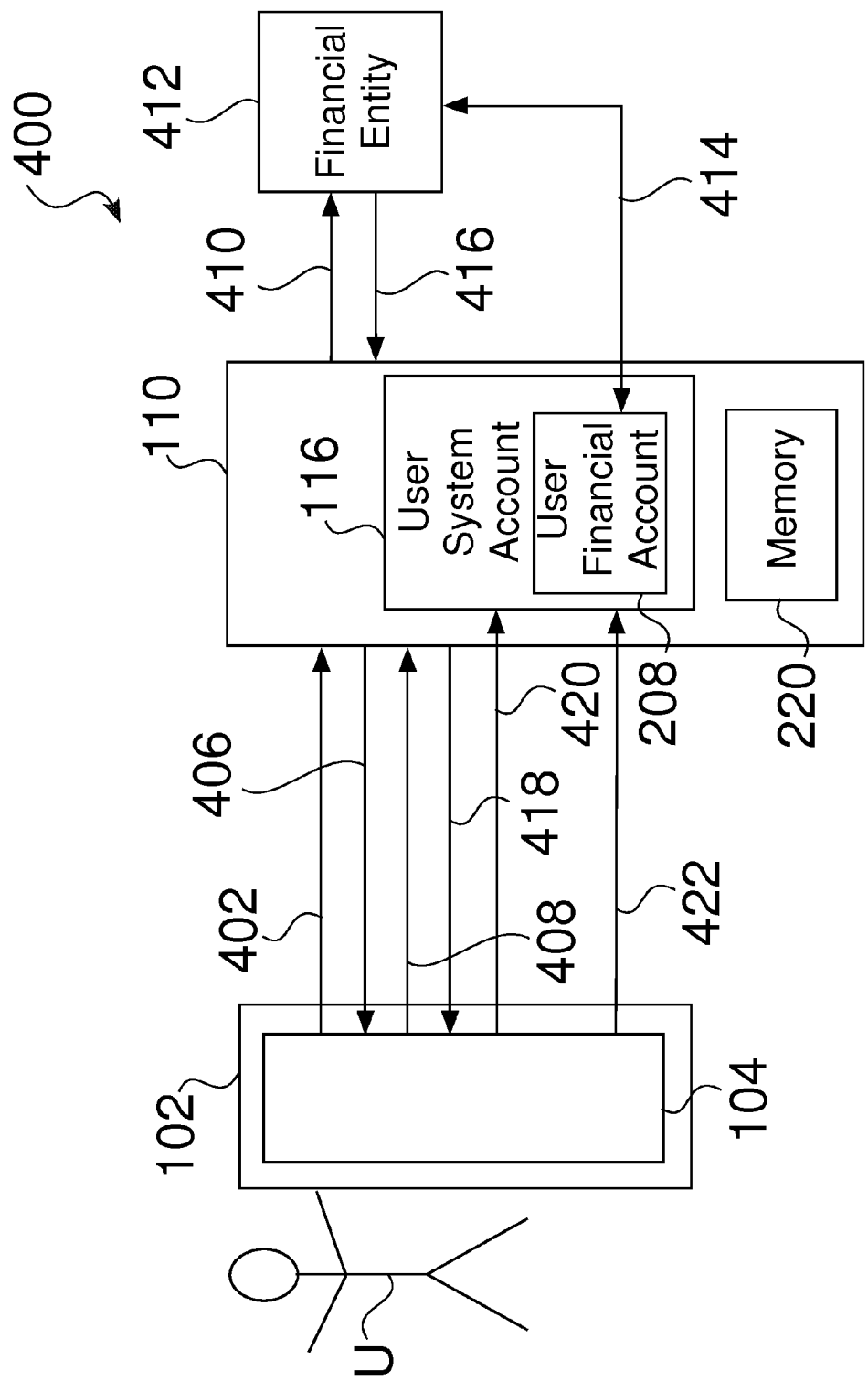
FIG. 4 is a schematic block diagram illustrating two factor authentication operations between a user at a device and a PS system.

FIG. 4 is a schematic block diagram illustrating two factor authentication 400 established between a user U at a device 102 and a PS system 110. The user U provides 402 an addressable handle 204 through an application 104 running on the device 102. The PS system 110 receives 402 the addressable handle 204, such as through a system server 114 (FIG. 2), and identifies an account state 1102 (FIG. 11), based on the receipt of the addressable handle 204, for example if the received addressable handle 204 is found to match that of an addressable handle 204 stored in memory 220 for the user system account 116 and corresponding device 102. Knowledge by the PS system 110 of the possession and access to a device 102 that is associated with the matching addressable handle 204 serves as a first factor in authentication.

The PS system 110 pushes 406 a notification 702 (FIG. 7) to the corresponding device 102, based on the account state 1102, wherein the notification 702 can typically include a prompt for a card security code associated with a user payment card 210 that is known to the PS system 110. In response to the notification 702, the user U can typically pull out their payment card 210, and enter 408 the card's security code through the application 104.

Upon receipt 408 of the security code by the PS system 110, the PS system 110 tests 1404 (FIG. 14) the correctness of the security code, such as by sending 410 an authorization request 902 (FIG. 9) for a nominal financial transaction to a financial entity 412, e.g. a bank or card issuer 124 (FIG. 1), that is associated 414 with the user financial account 208, wherein the authorization request 902 includes the received 408 security code. If the security code sent 410 to the financial entity 412 is correct, i.e. the security code matches that of the user's financial account 208, the financial entity returns 416 an authorization approval 904 (FIG. 9) to the PS system 110. Receipt 416 of the authorization approval 904 by the PS system 110 serves as a second factor in authentication, whereby the PS system 110 proceeds to grant 418 the user U access 420 to their user system account 116, wherein the user U can view or control the settings in the user system account 116, e.g. such as associated with the payment account 208, and/or can initiate 422 a monetary transfer through the payment account 208.

Figure 5:
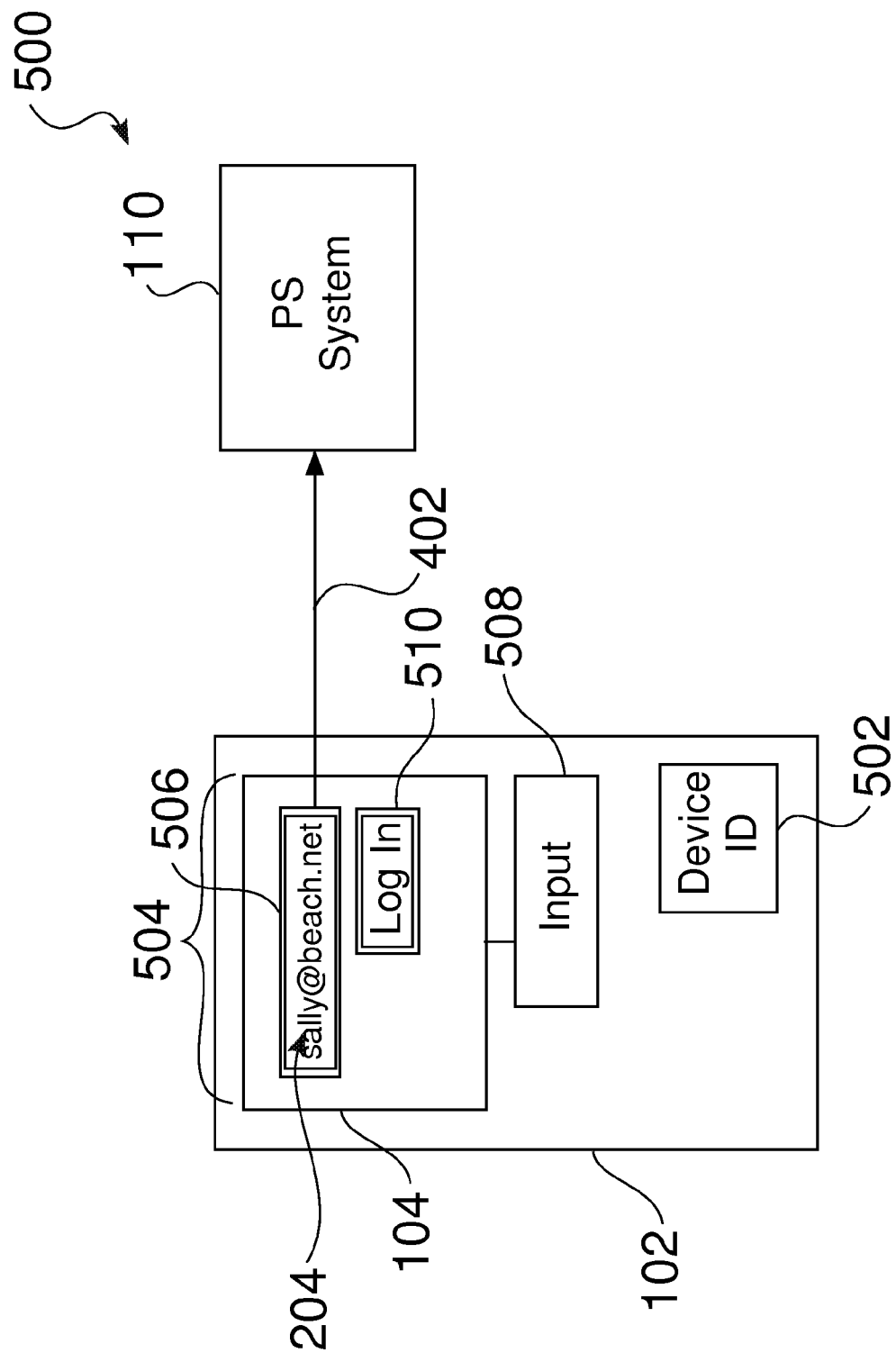
FIG. 5 is a schematic diagram illustrating a transmission of an addressable handle from a device to a PS system.

FIG. 5 is a schematic diagram illustrating a transmission of an addressable handle 204 from a device 102 to a PS system 110. As seen in FIG. 5, a log-in 500 is initiated by user entry of an addressable handle 204 through a user interface (UI) associated with an application 104 on a device 102, and a subsequent transmission 402 of the addressable handle 204 from the device 102 to the PS system 110. The illustrative mobile device 102 seen in FIG. 5 has a device identifier 502, wherein mobile communication from the mobile device 102 is readily identified, such as for billing and/or tracking purposes. The illustrative application 104 shown in FIG. 5 includes a screen interface 504 having an addressable handle entry window 506, and a log-in button 510, whereby a user U can input 508 their addressable handle 204, and initiate a log-in 500 with the PS system 110.

It should be noted that the illustrative entry screen 504 shown in FIG. 5 does not include a password entry window, because the two factor authentication technology described here alleviates this requirement for users U that have already established a user system account 116. In other words, the PS system 110 gains familiarity with a registered user U, based on what the PS system 110 knows about the user U.

In a similar context, a local merchant usually recognizes customers who regularly do business with them, often knowing their appearance, their name, their personality, and their preferences. Based on such familiarity, the local merchant may increase their trust in the customer, and treat the customer based on this increased level of trust.

The illustrative entry screen 504 shown in FIG. 5 may also be used for initial system entry for a new user U, whereby, upon entry of an addressable handle 204 that is not recognized by the PS system 110, the new user U can be prompted to establish a user system account 116, and supply relevant information as needed.

Figure 6:
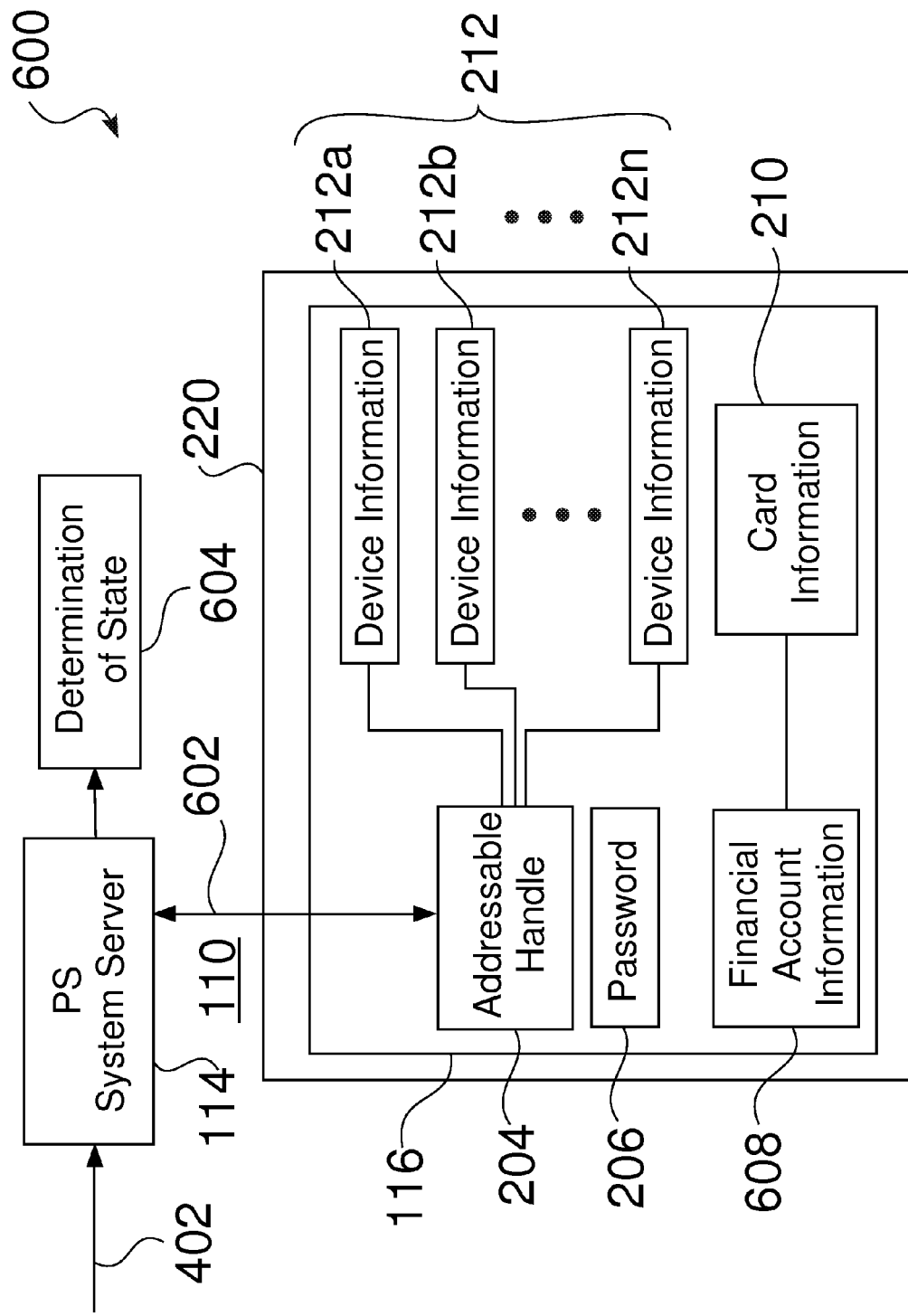
FIG. 6 is a schematic diagram illustrating PS system operations performed in response to the receipt of an addressable handle.

FIG. 6 is a schematic diagram illustrating system operations 600 performed in response to the receipt 402 of an addressable handle 204 or similar information, e.g. a user name. The PS system 110 determines 604 the state 1102 (FIG. 11) of the user U, typically based on whether the user U has already established a user system account 116, whether the user has established a password 206, and/or whether the user U has an application 104 installed on the device 102 that is capable of receiving 406 push notifications 702.

At this point in the method, the PS system 110 conditionally establishes a primary level, i.e. a first factor 1402 (FIG. 14), of authentication, which is based on knowledge that the user U is in possession of and has access to a device 102 that corresponds to the user U and the addressable handle 204. If the user U has already established a user system account 116, such as determined through a match 602 between a received addressable handle 204 and a stored addressable handle 204, the PS system 110 can readily access other information known about the user U, such as the identities of one or more devices 102 that correspond to the user system account 116, based on stored device information 212, e.g. 212a-212n, and whether the device 102 through which the addressable handle 204 was received 402 corresponds to a device 102 that the PS system 110 already attributes to the user U. As also seen in FIG. 6, the PS system 110 can call up financial account information 608, and card information 210.

Figure 7:
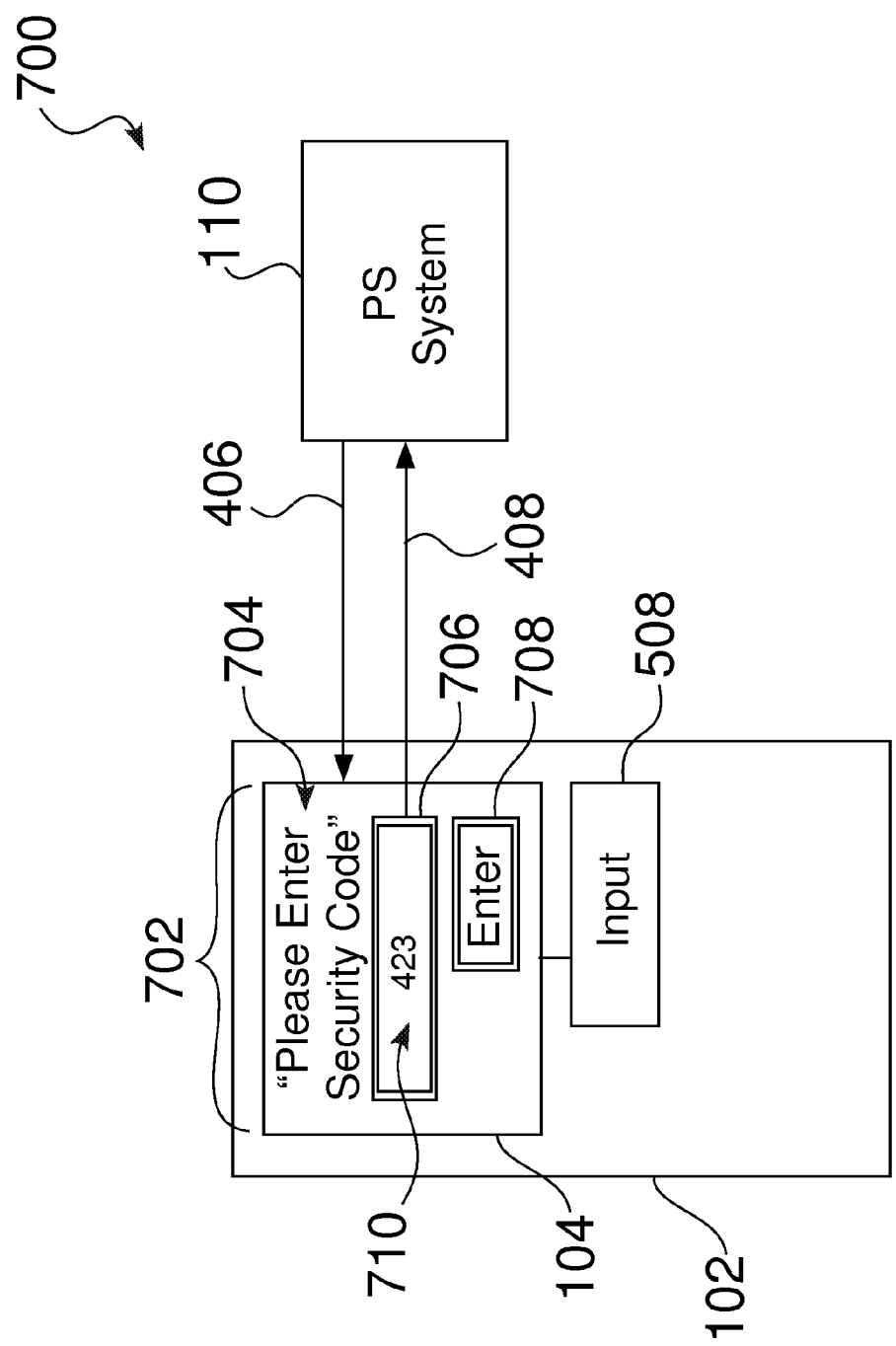
FIG. 7 is a schematic diagram illustrating push notification to prompt user entry of a security code.

FIG. 7 is a schematic diagram illustrating operations 700 for a pushed notification 702 to prompt user entry of a security code. Based on a determination 604 of an appropriate state 1102, e.g. state 1102d (FIG. 11), the PS system 110 pushes 406 a notification or query 702 to a device 102 corresponding to the user U, wherein the device 102 comprises a device 102 that corresponds to the confirmed user system account 116, and often will be the device 102 from which the addressable handle 204 was received 402, such as entered by the user U through application 104. The illustrative notification 702 seen in FIG. 7 appears as an interface window 706, which includes a prompt 704 for a security code 710, e.g. "Please Enter Security Code", an entry window 706, and a submit or enter button 708. While some embodiments of the interface window 706 include a submit or enter button 708, other embodiments are configured to act upon an entered security code 710 as the last digit is entered. For the illustrative three digit security code 710 "423" shown in FIG. 7, the technology can proceed as soon as the "3" is entered.

Figure 8:
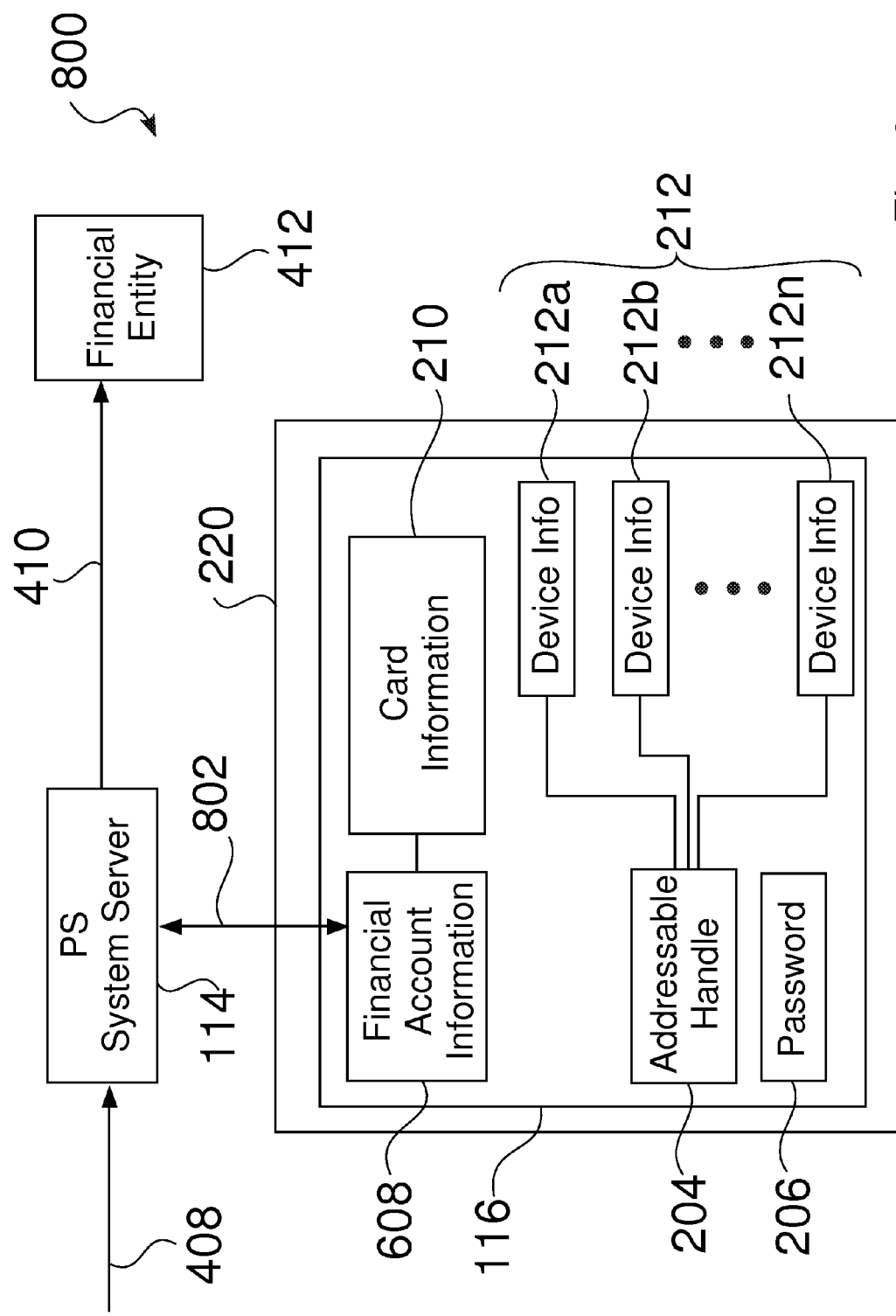
FIG. 8 is a schematic diagram illustrating PS system operations performed in response to the receipt of a requested security code.

FIG. 8 is a schematic diagram illustrating system operations 800 performed in response to the receipt 408 of a security code e.g. a CVV. The PS system 110, such as through server 114, can query, call, or otherwise perform a lookup 802 on the financial account information 608 in memory 220, to confirm the financial account 208 that is associated with the determined user system account 116. The PS system 110 sends 410 an authorization request 902 (FIG. 9) to a financial entity 412 that corresponds to the user financial account 208, wherein the authorization request 902 includes the security code received from the user U, and comprises a request to receive 416 an authorization approval 904 (FIG. 9) for a financial transaction, e.g. for $1 or less, on the user's financial account 208. In some illustrative embodiments of the technology, the authorization request 902 simply requests a verification of the received entry code, without a request for a financial transaction.

At this point in the authentication method, if the security code is verified 904, the PS system 110 has achieved a second authentication factor towards the corresponding device 102 and the user U, wherein both factors are based on information other than the user's system password 206. The illustrative two factor authentication with a push notification 702 is therefore based on three inputs, comprising the addressable handle 204, the possession of an application 104 on any device 102 that is associated with the user system account 116, and the security code from a payment card 210 that is associated with the user system account 116.

While some embodiments of the authentication method and system disclosed here include two factors of authentication, other embodiments may include a single factor of authentication, such as if the perceived security of a device 102 or application 104 is high, e.g., if the perceived security meets a predetermined threshold. Furthermore, some embodiments may include additional factors of authentication or confirmation, such as factors related to any of what the user knows, what the user has, where the user is, or who the user is.

Figure 9:
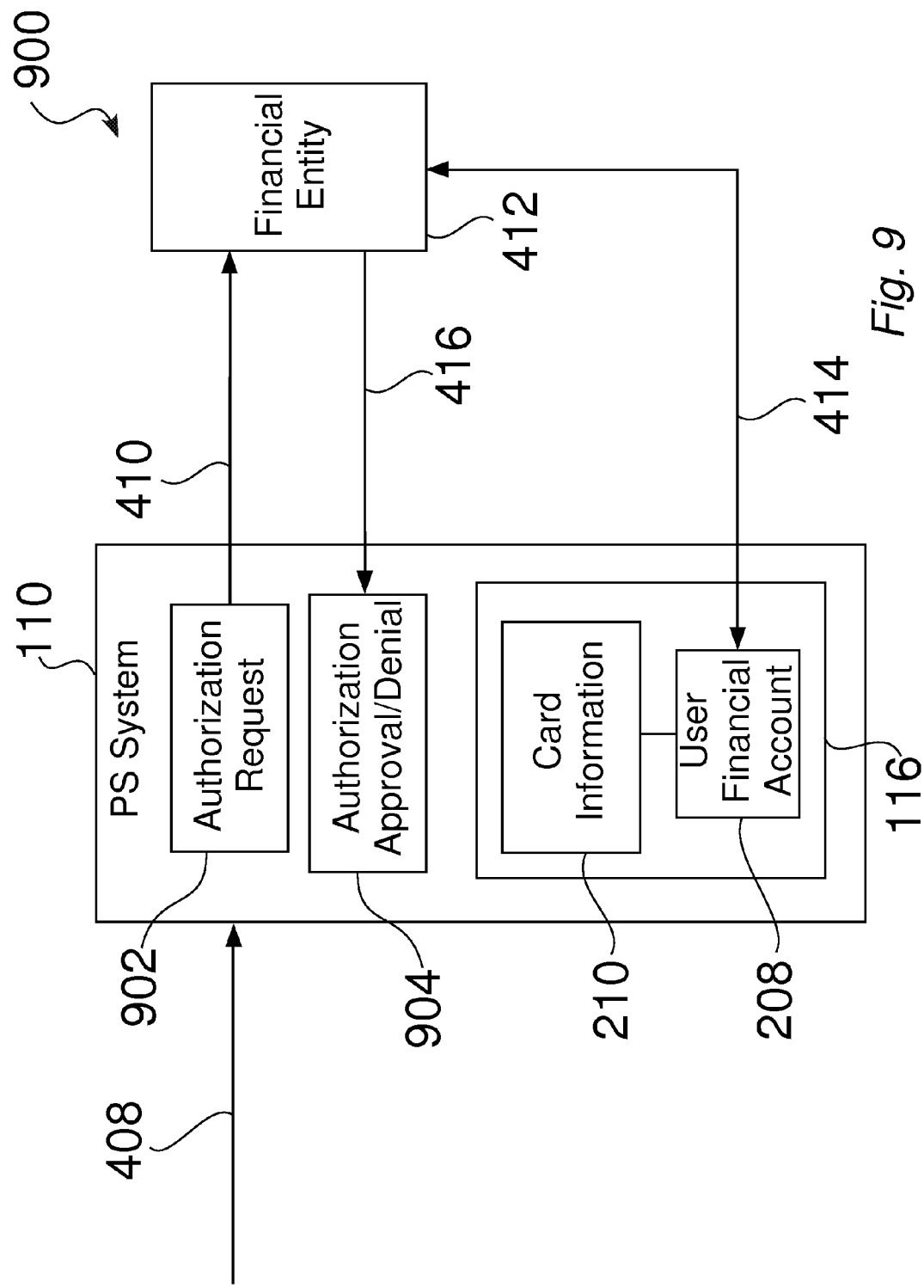
FIG. 9 is a schematic diagram illustrating operations associated the verification of a received security code.

FIG. 9 is a schematic diagram illustrating operations 900 associated with a verification of a received security code in some PS system embodiments. Upon the receipt 408 of a security code that corresponds to a user's financial account 208, the PS system 110 shown in FIG. 9 tests the correctness of the security code, by sending 410 an authorization request 902 for a nominal financial transaction to a financial entity 412, e.g. a bank or card issuer 124 (FIG. 1), that is associated 414 with the user financial account 208, wherein the authorization request 902 includes the received 408 security code. If the security code sent 410 to the financial entity 412 is correct, i.e. the security code matches that of the user's financial account 208, the financial entity 412 returns 416 an authorization approval 904 to the PS system 110. Receipt 416 of the authorization approval 904 by the PS system serves as a second factor in some of the authentication embodiments.

The illustrative operations 900 seen in FIG. 9 do not require that an actual financial transaction be initiated upon receipt 416 of the authorization approval 904, as the mere receipt 416 of the authorization approval 904 verifies that the proper user U is in communication with the PS system 110, through a device 102 that corresponds to the user system account 116.

Figure 10:
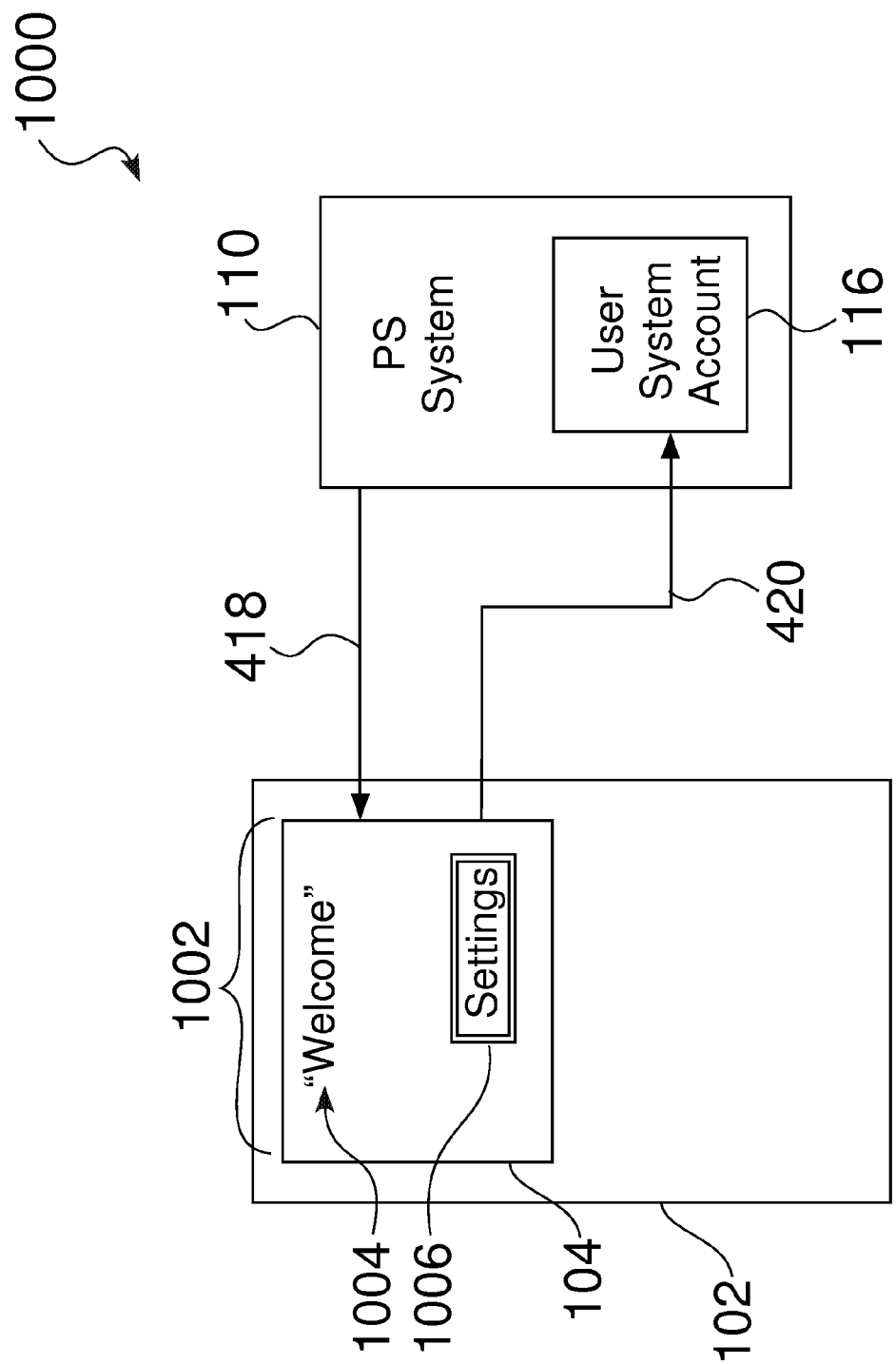
FIG. 10 is a schematic diagram illustrating the grant of access to a user system account, wherein the access is based on two factor authentication with push notification.

FIG. 10 is a schematic diagram illustrating operations 1000 associated with the grant 418 of access 420 to a user system account 116, wherein the access grant 418 is based on the authentication technologies described here that include a pushed 406 notification 702. When the illustrative PS system 110 shown in FIG. 10 determines that a device 102 and user U have met an acceptable level of authentication, the PS system 110 displays a system account entry screen 1002 to the user U, such as through the native application 104, or through a web browser. The entry screen 1002 provides access 420 for the user U to their user system account 116, and may provide information 1004 and/or access to the user's settings 1006, wherein the user U can view or control the settings 1006 in the user system account 116, e.g. such as associated with the payment account 208, and/or can initiate 422 (FIG. 4) a monetary transfer through the payment account 208.

Figure 11:
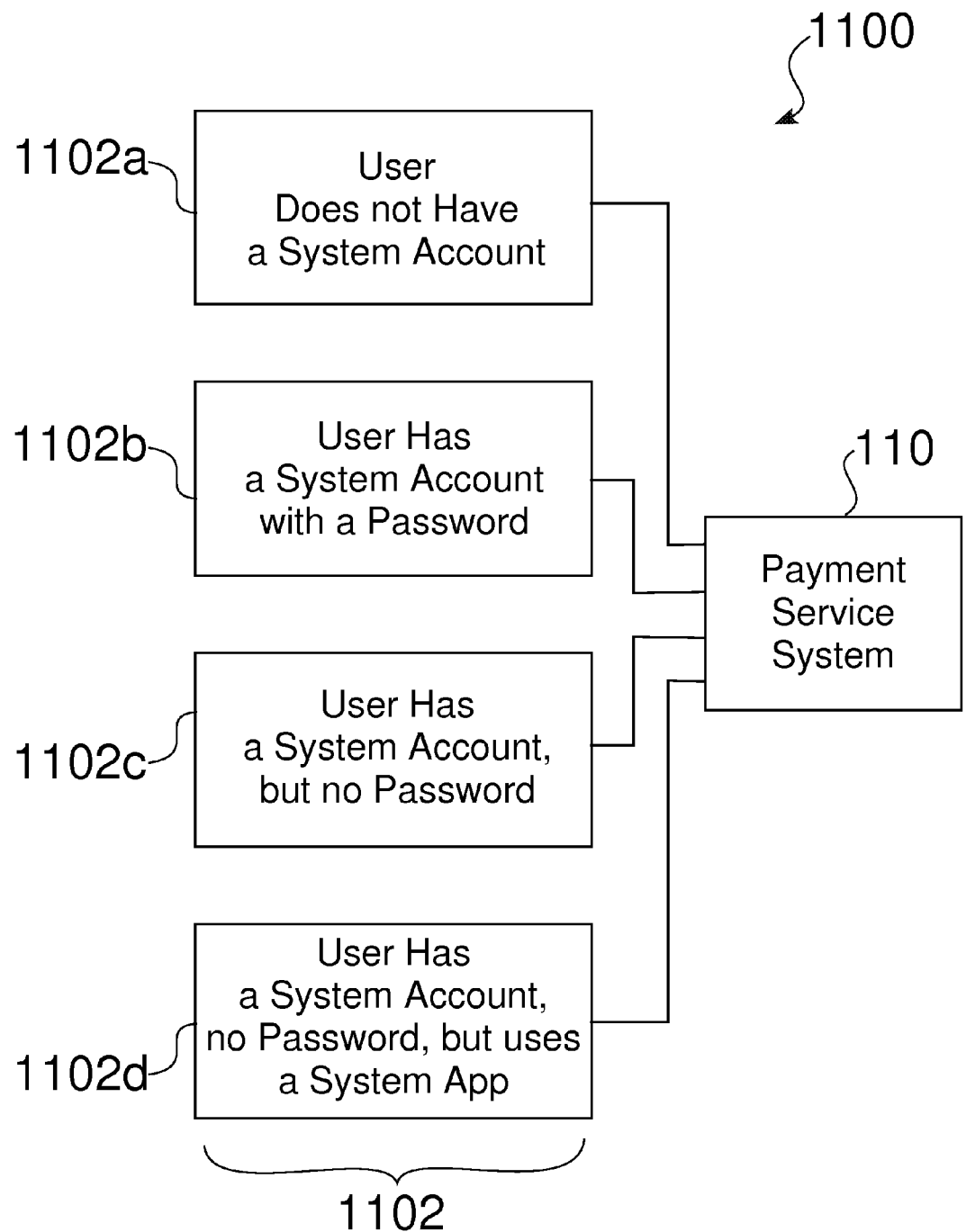
FIG. 11 is a schematic block diagram of illustrative user states that define a relationship between a user and a PS system.

FIG. 11 is a schematic block diagram 1100 of different user states 1102, e.g. 1102a-1102d, which are based on a determined relationship between a user U and the PS system 110. For example, a user U who does not have a user system account 116 with the PS system 110 is considered to belong to state 1102a, wherein the user U has never interacted with the PS system 110, which means that the user U has never sent an email and/or transferred cash through the PS system 110. A user U who has both a user system account 116 and a password 206, such as directly with the PS system 110, or through a related product or service, is considered to belong to state 1102b. A user U who has a user system account 116, but does not have a password 206, and does not access the PS system 110 through an application 104 related to the PS system 110, is considered to belong to state 1102c. Some embodiments of the payment service system 110 contact users U belonging to state 1102c, such as by email, to prompt them to create a system password 206.

As also shown in FIG. 11, a user U who has a user system account 116, and does not have a password 206, but accesses the PS system 110 through an application 104 related to the system 110, is considered to belong to state 1102d.

While some embodiments of the authentication technology described here may suitably be adapted for any user state 1102, the two-factor authentication is readily adapted for users of state 1102d, wherein no password 206 is needed, and wherein the PS system 110 can authenticate the user U, through information that is known about them, and through their interactions with the PS system 110, through the native application 104 on the user's device 102.

Figure 12:
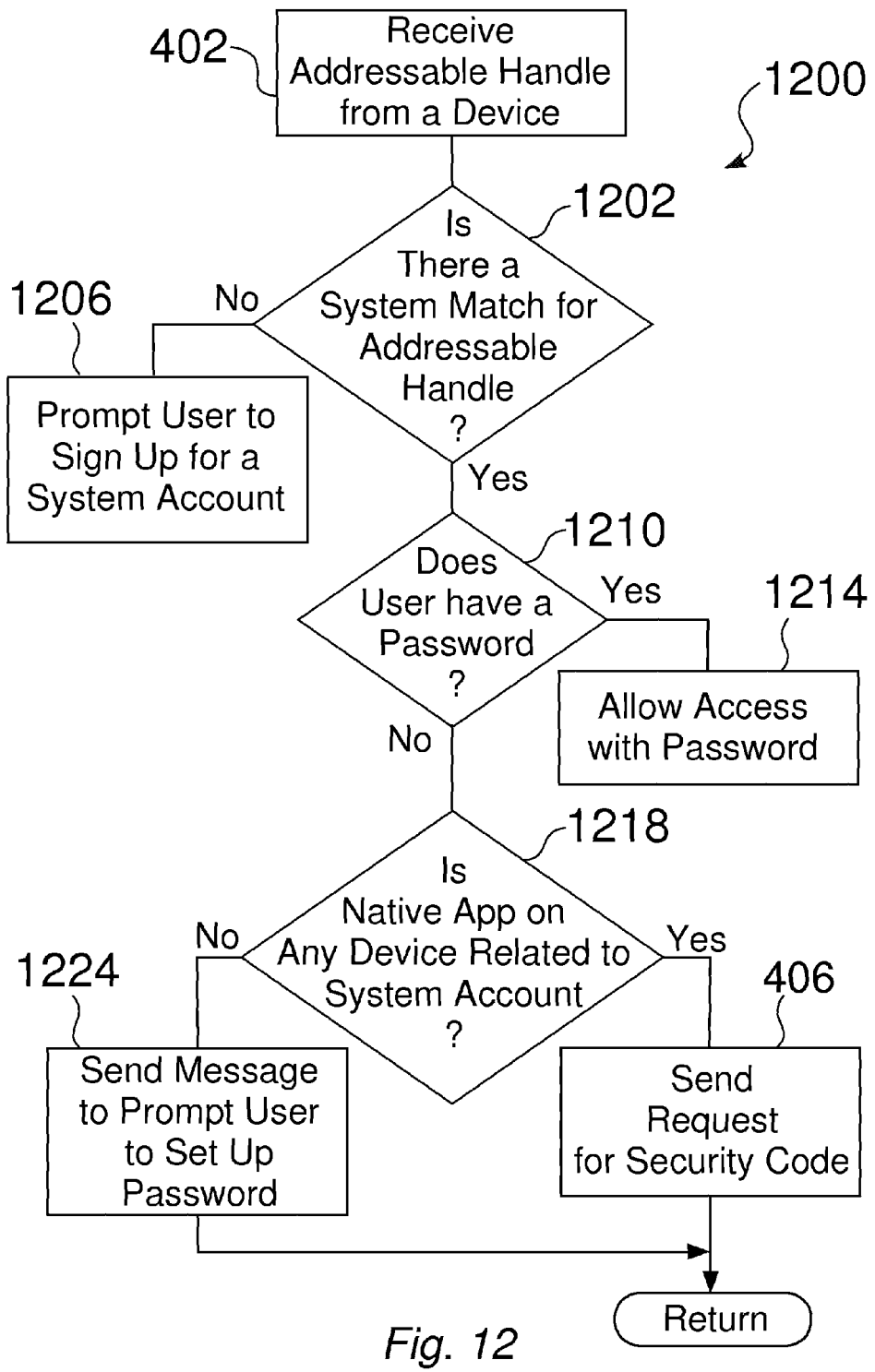
FIG. 12 is a flowchart of an illustrative method for determining user states, based in the receipt of an addressable handle.

FIG. 12 is a flowchart of an illustrative method 1200 for determining user states 1102, based in the receipt of initial user information, such as an addressable handle 204. For instance, upon receipt 402 of a user's addressable handle 204 from a device 102, the PS system 110 determines 1202 if the received addressable handle 204 matches that of an addressable handle 204 corresponding to a user system account 116. If not, the illustrative method 1200 shown in FIG. 12 considers the user to be in state 1102a, and prompts 1206 the user U to sign up for a user system account 116. If the received addressable handle 204 matches that of a user system account 116, the PS system 110 determines 1210 if the user U has a password 206 associated with the user system account 116. If so, the PS system 110 considers the user to be in state 1102b, wherein the PS system 110 can either grant 418 account access 420 upon entry of the correct password 206, or can alternately grant 418 access 420 without entry of the password 206, such as described below for other user states 1102.

If the PS system 110 determines 1210 that the user U does not have a password 206 associated with the user system account 116, the PS system 110 shown in FIG. 12 determines 1218 if any device 102 corresponding to the user system account 116 has an installed native application 104, such as an application 104 that is considered to be part of the PS system 110, through which the PS system 110 has a perceived trust level that is higher than an application that is independent from the PS system 110, such as a web interface, browser, or other interface.

If so, the user U is considered to be in state 1102d, as described above, whereby the PS system 110 proceeds to push 406 a notification 702 (FIG. 7) to the corresponding device 102, to prompt entry 408 of a security code, e.g. a CVV. If there is no corresponding device 102, the user U is considered to be in state 1102c, whereby the PS system 110 may preferably send a message to the user U, to prompt the user U to set up a password 206 for the user's system account 116.

It should be understood that the operations shown in FIG. 12 may be performed in a variety of sequences, as desired. For instance, the method 1200 can determine the existence of a native application 104 when the addressable handle 204 is first received.

Figure 13:
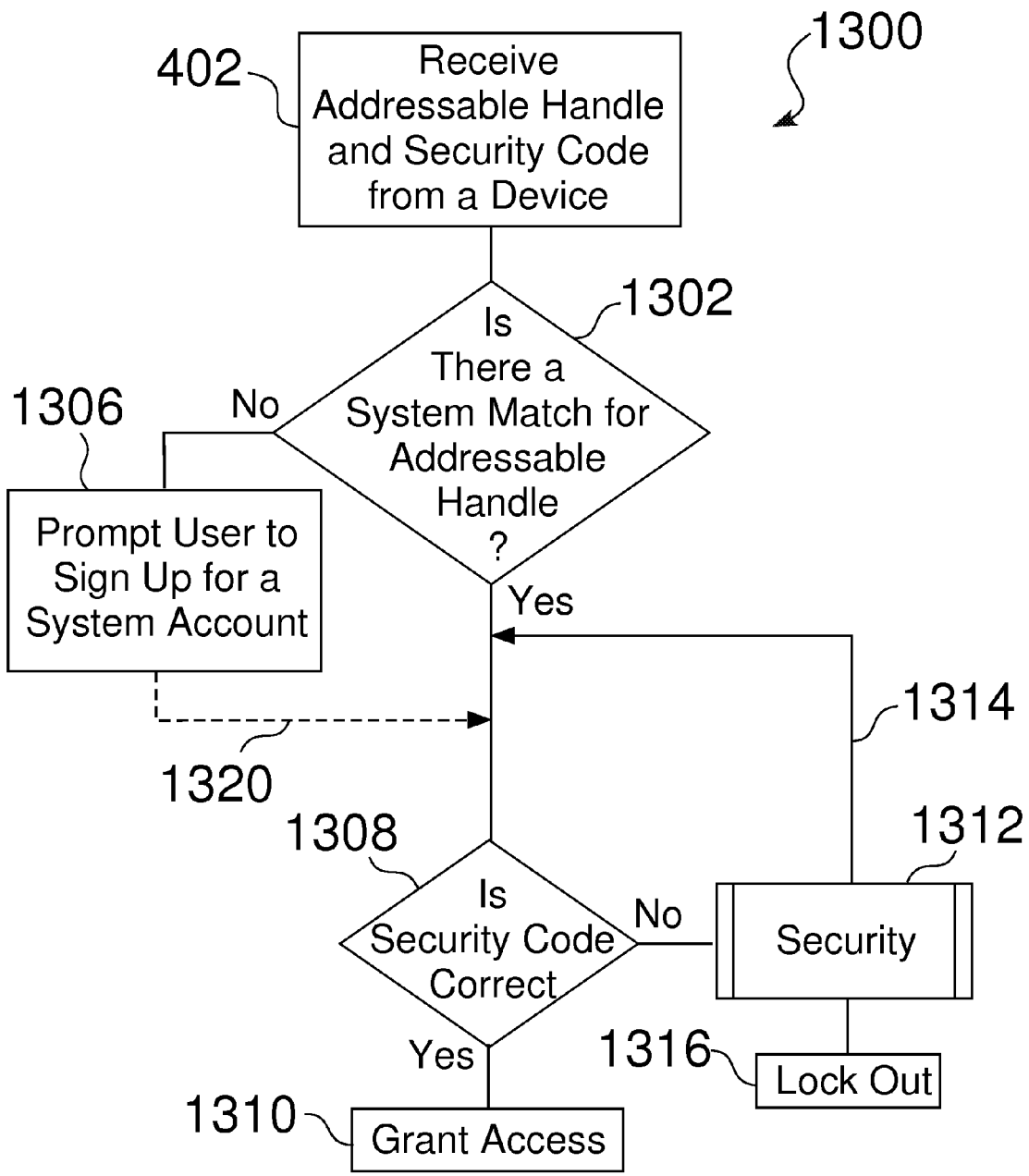
FIG. 13 is a flowchart of an alternate method for determining user states.

FIG. 13 is a flowchart of an alternate method 1300 for determining user states 1102, based in the receipt of initial user information, such as an addressable handle 204 and a security code that corresponds to the user's financial account 208. Upon receipt 402 of a user's addressable handle 204 from a device 102, the PS system 110 determines 1302 if the received addressable handle 204 matches that of an addressable handle 204 corresponding to a user system account 116.

In some embodiments, the method 1300 can prompt 1306 the user U to sign up for a user system account 116 if there is no match to a user system account 116.

Since the user U has also provided a security code, the illustrative method 1300 seen in FIG. 13 can proceed directly to code verification 1308, as described above. As seen in FIG. 13, a user U that has a user system account 116 is not required to use an application 104, and the user U can be securely authenticated without the use of a password 206. Furthermore, some embodiments of the method 1300 can 1320 allow users U who do not have a user system account 116 to be verified 1308, such as for limited access 1310 to proceed with a transaction for a financial or payment account 208 associated with their input security code.

As further seen in FIG. 13, if the received security code is determined 1308 to be incorrect, the PS system 110 can initiate a security procedure 1312, such as to send an access denial 904 (FIG. 9), and/or to allow 1314 reentry 408 of a security code a limited number of times (for a legitimate user to key in the correct security code), and to lock out 1316 access to the user system account 116 if the PS system 110 determines that an attempt is being made to hack into the user system account 116. For instance, the security procedure 1312 may be preset to allow up to three incorrect entries 408 of the security code before locking out for a limited time, e.g. 10 minutes, or alternately allowing the legitimate user U to provide an alternate form of authentication, e.g. the system password 206. As well, the security procedure 1312 may lock out 1316 access 420 for an extended period of time, if a large number of incorrect entries 408 of the security code are made, such as indicating hacking activity.

Figure 14:
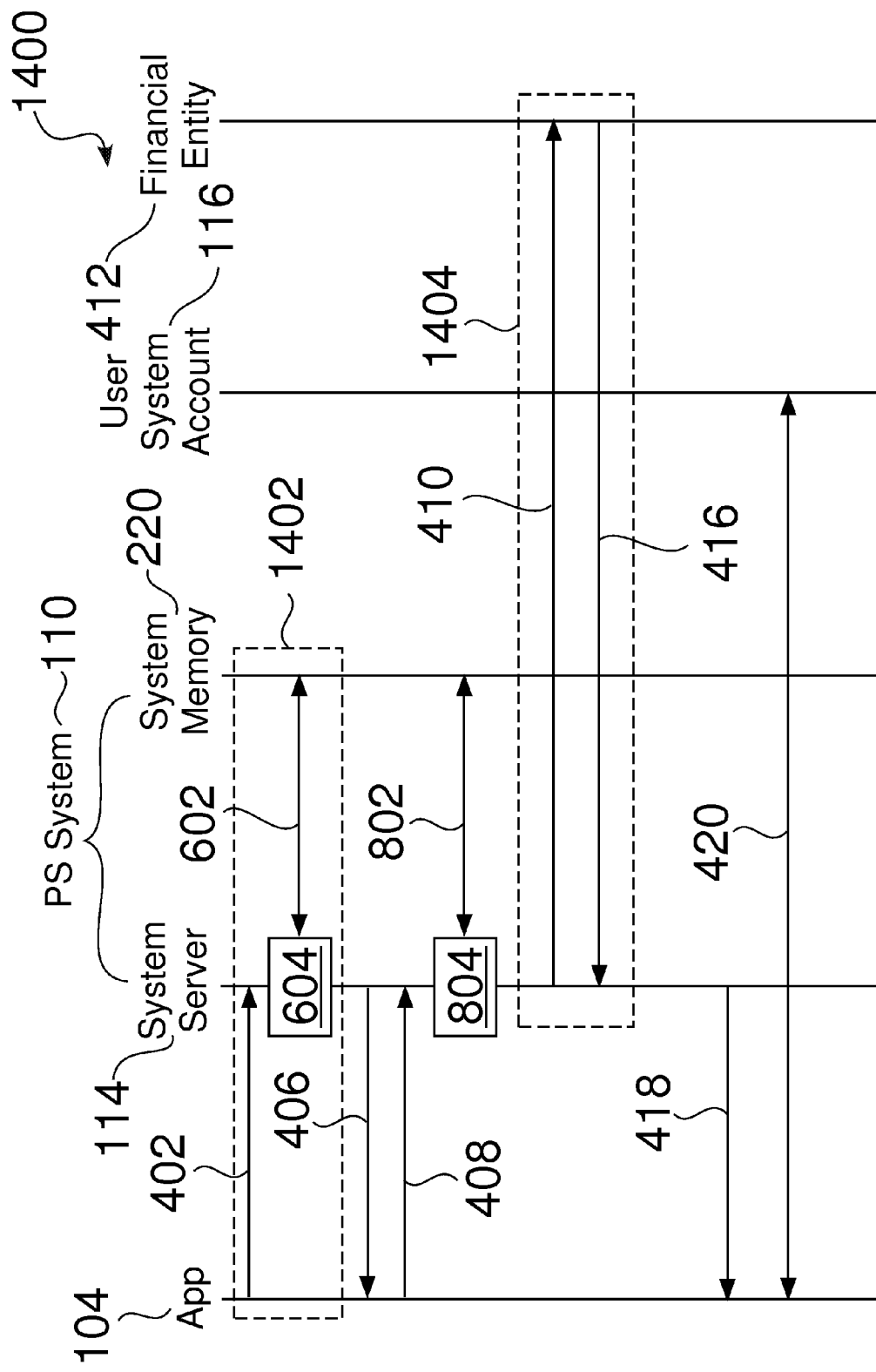
FIG. 14 illustrates operations performed in some illustrative embodiments of a two-factor authentication system.

FIG. 14 illustrates operations 1400 performed in some illustrative embodiments of a two-factor authentication system, such as consistent with the illustrative system embodiment shown in FIG. 4, and with the illustrative system operations shown in FIGS. 5-10. For example, an addressable handle 204 can be entered by a user U through a native application 104 that is installed on a mobile device 102, wherein the mobile device 102 is related to the user U and to the user's system account 116. Furthermore, the installed native application 104 may also be associated with both the device 102 and the corresponding user U.

Upon entry 402 of the addressable handle 204, the PS system 110, such as through server 114, may query, call, or otherwise perform a lookup 602 in memory 220, to determine if the received addressable handle 204 corresponds to a user system account 116. If so, some embodiments of the PS system 110 determine if there is a password 206 established for the user U, either directly for the user system account 116, or through a related account.

The PS system 110 then determines 604 a state 1102 for the user U, based on information received from the user U and/or otherwise known by the PS system 110. In the embodiment shown in FIG. 14, an illustrative user U has a user system account 116, and has a native application 104 installed on their device 102, so the user U is not required to have a password 206, and is determined 604 to be in state 1102d. At this point a first factor 1402 of authentication is attained, based on knowledge that the user U is in possession of and has access to a device 102 that corresponds to the user U and the addressable handle 204.

In some illustrative embodiments of the authentication technology that require a second authentication factor, the PS system 110 shown in FIG. 14 pushes 406 a notification 702 to the application 104, to prompt 704 the user U to enter 408 a security code, such as a CVV code that corresponds to a payment card 210 that is associated with their user system account 116.

Once the user U enters and transmits 408 the requested security code, the PS system 110 shown in FIG. 14 tests 1404 the correctness of the security code, such as by sending 410 an authorization request 902 (FIG. 9) for a nominal financial transaction to a financial entity 412, e.g. a bank or card issuer 124 (FIG. 1), that is associated 414 with the user financial account 208, e.g., a payment account 208, wherein the authorization request 902 includes the received 408 security code. If the security code sent 410 to the financial entity 412 is correct, i.e. the security code matches that of the user's financial account 208, the financial entity 412 returns 416 an authorization approval 904 (FIG. 9) to the PS system 110, which signifies a second authentication factor for the user U.

When the illustrative PS system 110 determines that a device 102 and user U have met an acceptable level of authentication, the PS system 110 grants 418 or otherwise allows 418 the user U to access 420 their user system account 116 and settings 1006 (FIG. 10) through the application 104.

Figure 15:
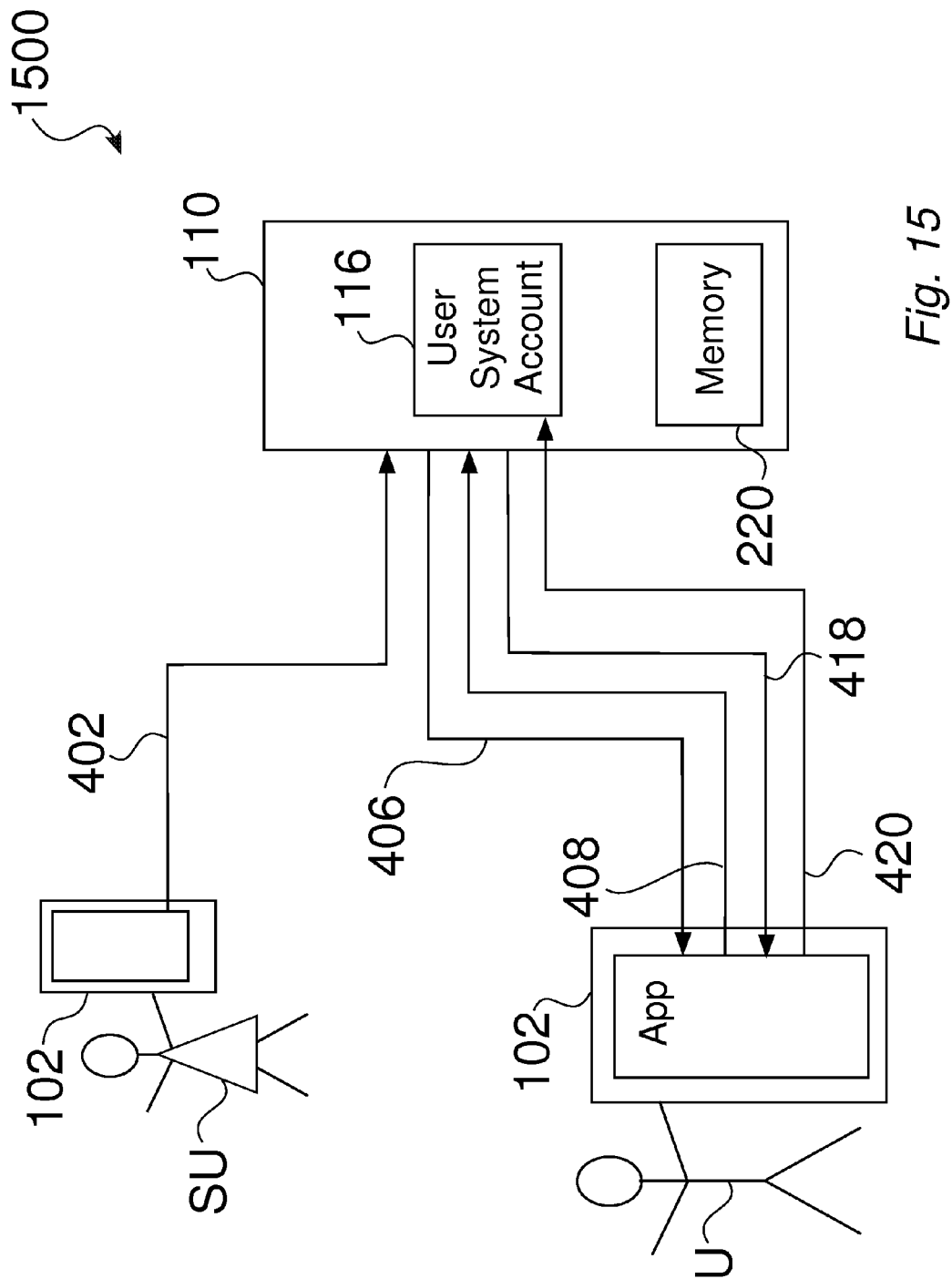
FIG. 15 is a schematic block diagram that illustrates two factor authentication for one or more devices, wherein the authentication can be initiated through a device other than that of a primary user.

FIG. 15 is a schematic block diagram that illustrating two factor authentication operations 1500 for one or more devices 102, wherein the authentication can be initiated through a device 102 other than that of a primary user U. In the illustrative embodiment shown in FIG. 15, a primary user U is considered to be the primary account holder of a user system account 116 in the PS system 110. A secondary user SU, such as a relative, friend, employee, or proxy of a primary user U, has a device 102 that may or may not be associated with the primary user's system account 116. The secondary user's device 102 may or may not have a native application 104.

In operation, the secondary user SU enters an addressable handle 204 or other user information, e.g. a username, through the device 102, which is sent 402 to the PS system 110. The PS system 110 receives 402 the addressable handle 204, and identifies an account state 1102 (FIG. 11), based on the receipt of the addressable handle 204, for example if the received addressable handle 204 is found to match that of an addressable handle 204 stored in memory 220 for the primary user system account 116.

In some illustrative embodiments, for a device 102 that is not considered to a primary or preferred device 102 for the user system account 116, a notification 702 is pushed 406 to the primary user U at the primary or preferred device 102, such that the primary user U can make a decision to allow any of system access 420 or approval of a financial transaction 422 by the secondary user SU through the secondary device 102.

In other illustrative embodiments, such as previously approved through user settings 1006 (FIG. 10), the secondary device 102 may be selected by the primary user U to be pre-authorized for full or partial account access 420, and/or for one or more financial transactions 422.

For instance, consider a primary user U that is the parent of the secondary user SU shown in FIG. 15. The primary user U may allow, such as through settings 1006, shopping or transactions 422 by their child SU, such as limited to any of a date, a transaction amount, a time span, a product type, a service type, a creditor, a website, or a brick and mortar location.

In this example, a daughter SU leaving home to drive to college may be pre-approved, through system settings 1006, by her father or mother U as the primary account holders U, to pay for food, travel expenses, and lodging during her expected travel dates. For financial transactions 422 that extend beyond the scope of pre-approved transactions by her parents U, the PS system 110 can push 406 a notification 702 to a device 102 that corresponds to the one or both parents U, whereby the parents U can submit 408 their security code to access their user system account 116, to either proceed with a transaction 422 for their daughter SU, or to change their account settings 1006, to allow their daughter SU, as their proxy, to proceed with the financial transaction 422.

Figure 16:
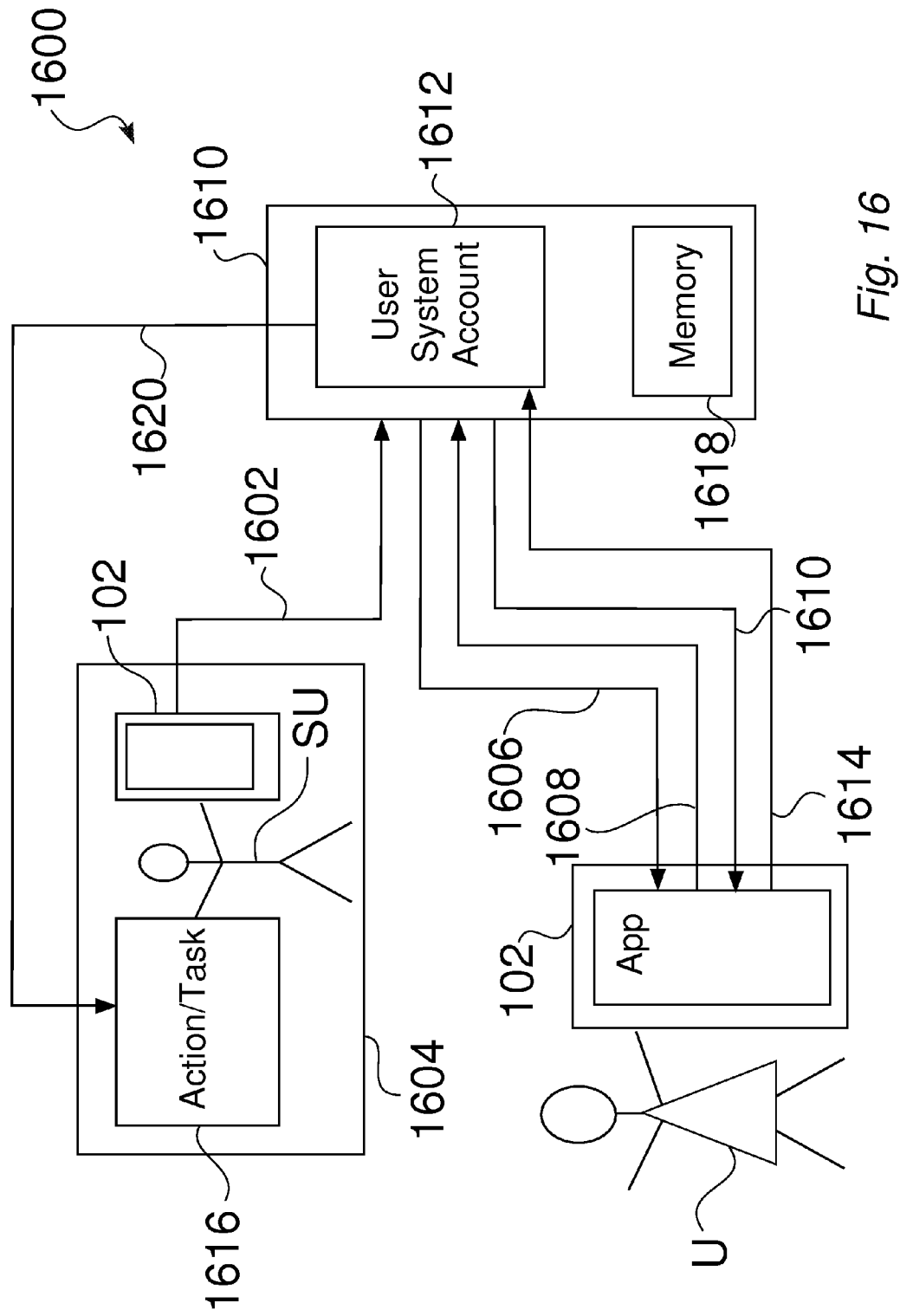
FIG. 16 is a schematic block diagram that illustrates two factor authentication established between a primary user and a secondary user, such as to provide secure remote authorization for an action or task.

FIG. 16 is a schematic block diagram that illustrates two factor authentication operations 1600 for one or more devices 102, wherein the authentication is initiated through a device 102 other than that of a primary user U, such as to provide secure remote authorization for an action or task 1616.

In the illustrative embodiment shown in FIG. 16, a primary user U is considered to be the primary manager, owner, or decision maker for an entity 1604, such as a business or other institution. As also seen in FIG. 16, the primary user U is also associated with a user system account 1612 within a central system 1610.

A secondary user SU, such as an employee, associate or other person associated with the entity 1604, has a device 102 that may or may not be associated with the primary user's system account 1612. The secondary user's device 102 may or may not have a native application 104.

In operation, the secondary user SU enters an addressable handle 204 or other user information, e.g. an employee number or a username, through the device 102, which is sent 1602 to the central system 1610. The secondary user SU may additionally provide an authorization request for an action 1616, which can be controllably and securely authorized by the primary user U.

The central system 1610 receives 1602 the addressable handle 204, and identifies an account state 1102 (FIG. 11), based on the receipt 402 of the addressable handle 204, for example if the received addressable handle 204 is found to match that of an addressable handle 204 stored in memory 1618 for the primary user system account 1612.

In the illustrative embodiment shown in FIG. 16, a notification 702 is pushed 1606 to the primary user U at the primary or preferred device 102, such that the primary user U can make a decision to authorize an action or task 1616 to be taken by the secondary user SU.

In some illustrative embodiments, such as previously approved through user settings 1006 (FIG. 10), the secondary device 102 may be selected by the primary user U to be pre-authorized for full or partial account access 1614, and/or for one or more actions or tasks 1616.

For instance, consider a primary user U that is the owner of a business 1604 shown in FIG. 16. The primary user U may allow, such as through settings 1006, a variety of actions or tasks 1616 to be taken by the secondary user SU, wherein the actions or tasks are consistent with the worker's job level and experience. Such operations may not require authorization through the central system 1610, or may be locally authorized between the secondary user and the system 1610, whereby the primary user U can observe how the business is run, even when the primary user U is away.

As well, the primary user U may control, such as through settings 1006, a variety of actions or tasks 1616 to be taken by the secondary user SU, wherein the actions or tasks are desired to be controlled directly by the primary user U, even when the primary user U is not readily available.

In this example, an employee of a retail business may be pre-approved, through system settings 1006, by the owner or manager U, as the primary user U, to conduct routine sales. For tasks or actions 1616 that extend beyond the scope of pre-approved tasks or actions 1616 by his manager or boss U, such as sales of certain items, sales beyond a certain monetary amount, discounts, and/or returns, the central system 1610 can push 1606 a notification 702 to a device 102 that corresponds to the primary user U, whereby the primary user U can submit 1608 their security code to access their user system account 1612, to either accept or deny the requested authorization by the secondary SU, or to change their account settings 1006, to allow the secondary user SU, as their proxy, to proceed with and take responsibility for the requested action or task 1616.

In this example, the employee SU does not initially have permission to proceed with every desired action or task 1616. In conventional business environments, the employee may be required to call, email, or travel to the location of the manager, to ask for permission. In such a conventional scenario, the owner may be required to provide secure information to the employee, e.g. an override code for a store register, which defeats the purpose of the security code.

In the system operations 1600 seen in FIG. 16, the central system 1610 can send 1606 a notification 702 to the primary user U at their device 102, where they can enter a security code associated with the user system account 1612, and grant 1620 a limited, e.g., one-time, permission for the requesting employee SU to proceed with the requested action or task 1616.

In the illustrative system 1600 seen in FIG. 16, the security code to access the user system account 1612 is not required to be associated with a user financial account 208, and may comprise a security code that is stored within the central system 1610. Therefore, after submission of the security code by the primary user U, the central system 1610 can match the received security code to stored account information, e.g., 608, 210. As well, the central system 1610 seen in FIG. 16 is not necessarily required to verify the security code with an external entity 412 (FIG. 4).

Figure 17:
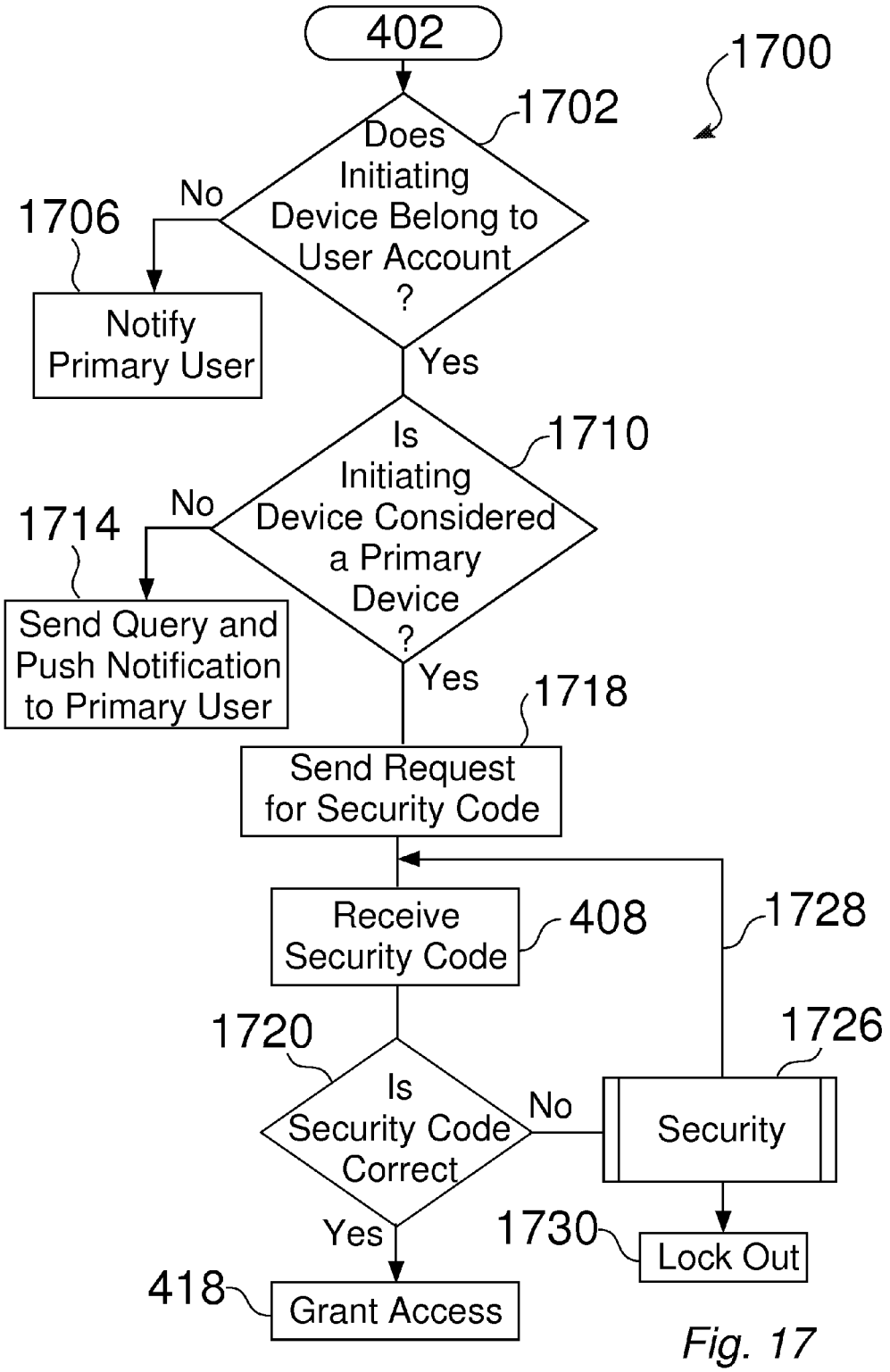
FIG. 17 is a partial flowchart illustrating a method for multiple factor authentication, which includes a determination of initiating device states, and illustrative PS system security procedures.

FIG. 17 is a partial flowchart illustrating a method 1700 for multiple factor authentication, which includes a determination of initiating device states 1102, and illustrative security procedures. The method 1700 can respond appropriately to secondary users SU that are known to the user U, and can also protect the user U and their user system account 116 from unwanted access.

In some embodiments, the illustrative method 1700 seen in FIG. 17 can be integrated after the matching 1202 (FIG. 12) of a received addressable handle 204 to a user system account 116. In the illustrative method 1700, the PS system 110 determines 1702 if the initiating device 102, i.e. the mobile device 102 through which a matching addressable handle 204 was sent 402, corresponds to the user's system account 116. The identification of the initiating device 102 can be based on information available to the PS system 110, such as device ID 502, an application ID, and/or other information available through the application 104.

In some situations, the initiating mobile device 102 corresponds to the user U or to a known relative or friend SU (FIG. 14), but is not currently listed as corresponding to the user system account 116. In other situations, such as for a person that is not considered to be a legitimate user, but who knows an addressable handle 204 of the primary user U, the initiating device 102 can still be used to initially send the addressable handle 204.

In the illustrative method 1700, if the PS system 110 determines 1702 that the initiating device 102 does not correspond to the user's system account 116, the PS system 110 can notify 1706 the primary user U, so that the primary user U can determine how to proceed. For example, the PS system 110 can provide the primary user U with information related to the initiating device 102, such as device ID 502, caller ID, device type, device location, or any combination thereof. At this point, for a known and legitimate user SU, the primary user U may preferably proceed to access their user system account 116, to add the initiating device 102 to their user system account 116, to adjust their settings 1006 for the secondary user SU, and/or to control transaction settings 1006 associated with the newly listed device 102.

As also seen in FIG. 17, if the PS system 110 determines 1702 that the initiating device 102 does belong to the user system account 116, the method 1700 then determines 1710 if the initiating device 102 is considered to be a primary device 102, e.g. a device 102 that is considered to be directly associated with the primary user U, and has full access to the user's system account 116 upon full authentication. If so, the method 1700 can operate as seen in FIG. 12 or FIG. 13, wherein the PS system 110 proceeds based on a determined user state 1102, e.g. 1102b-1102d.

If the illustrative method 1700 determines 1702 that the initiating device 102 does belong to the user's system account 116, but is not considered to be a primary device 102, the method 1700 can send 1714 a query and notification 702 to at least the primary user U, such as controlled through the user's settings 1006.

For the illustrative family described above, the daughter SU may be pre-approved for some purchases by her father U, whereby a notification 702 can be sent to the daughter SU, who can input her father's security code, or her own security code, and proceed with one or more transactions that are controlled through the account settings 1006. In this example, the method 1700 may send a message or query 1714 to the father's device 102, such as to confirm that account access has been initiated through his daughter's device 102.

As further seen in the illustrative method 1700, the PS system 110 can determine 1720 if the received security code is correct, as described above. If so, the method 1700 proceeds to grant 418 access 420 to the user system account 116. If the received security code is determined 1720 to be incorrect, the PS system 110 can initiate a security procedure 1726, such as to send an access denial 904 (FIG. 9), and/or to allow 1728 reentry 408 of a security code a limited number of times (for a legitimate user to key in the correct security code), and to lock out 1730 access to the user system account 116 if the PS system 110 determines that an attempt is being made to hack into the user system account 116. For instance, the security procedure 1726 may be preset to allow up to three incorrect entries 408 of the security code, before locking out for a limited time, e.g. 10 minutes, or alternately allowing the legitimate user U to provide an alternate form of authentication, e.g. the system password 206. As well, the security procedure 1726 may lock out 1730 access 420 for an extended period of time, if a large number of incorrect entries 408 of the security code are made, such as indicating hacking activity.

The authentication technologies described here thus controllably provide secure system access 420 for a user U, by leveraging convenient information, e.g. their addressable handle 204 and security code 206, in combination with securely stored information that the PS system 110 already knows about the user U. Even if the user U has a password 206 that corresponds to their user system account 116, they are not required to enter the password 206 to gain secure access to their user system account 116.

Figure 18:
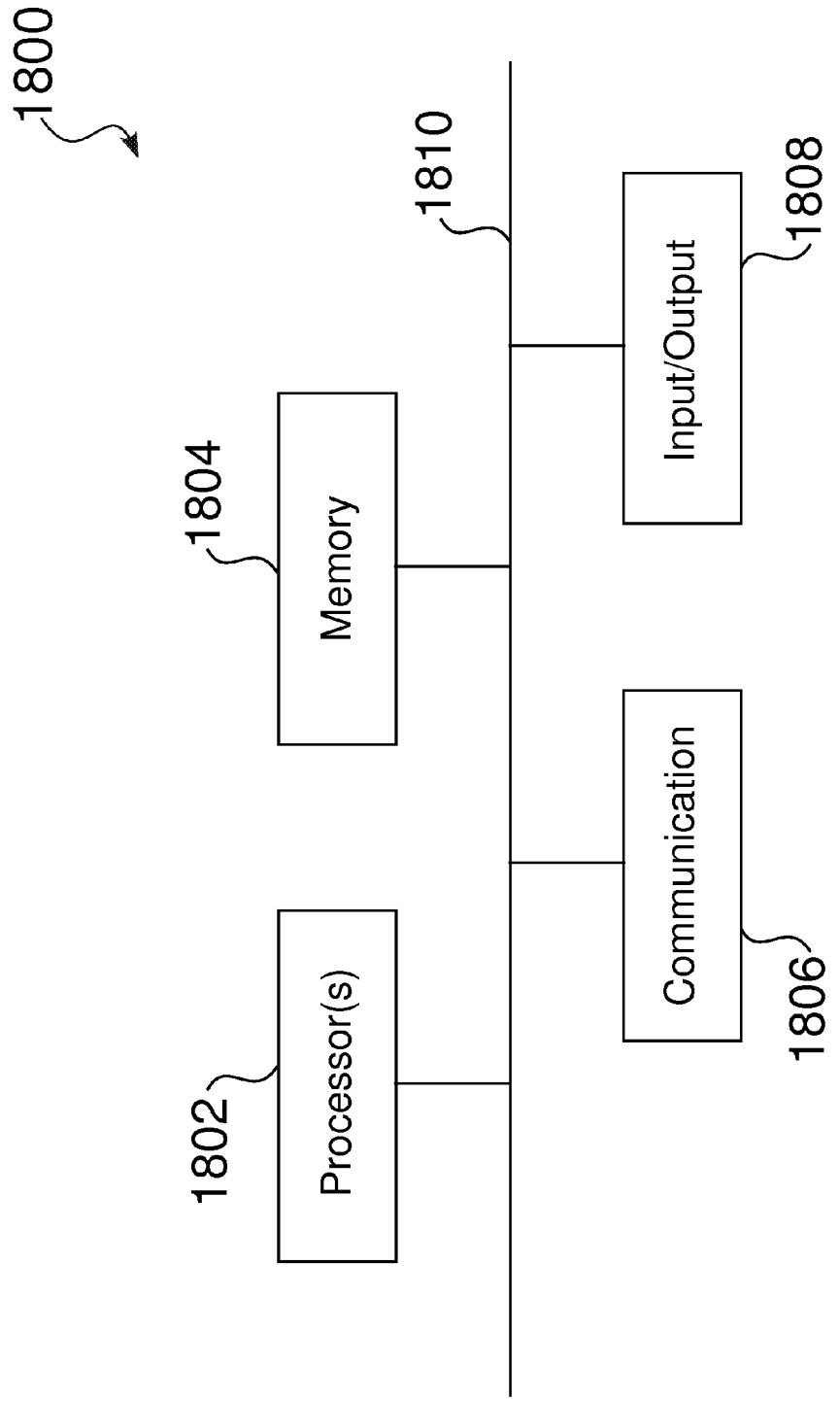
FIG. 18 is a high-level block diagram illustrating a processing system in which at least some operations related to an authentication system with push notification can be implemented.

FIG. 18 is a high-level block diagram showing an example of a processing device 1800 that can represent any of the devices described above, such as the mobile device 102, the PS system 110, or other systems related to authentication and/or transactions. As noted above, any of these systems may include two or more processing devices 102 such as represented in FIG. 18, which may be coupled to each other via a network or multiple networks.

In the illustrated embodiment, the processing system 1800 includes one or more processors 1802, memory 1804, a communication device 1806, and one or more input/output (I/O) devices 1808, all coupled to each other through an interconnect 1810. The interconnect 1810 may be or include one or more conductive traces, buses, point-to-point connections, controllers, adapters and/or other conventional connection devices. The processor(s) 1802 may be or include, for example, one or more general-purpose programmable microprocessors, microcontrollers, application specific integrated circuits (ASICs), programmable gate arrays, or the like, or a combination of such devices. The processor(s) 1802 control the overall operation of the processing device 1802. Memory 1804 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1804 may store data and instructions that configure the processor(s) 1802 to execute operations in accordance with the technologies described above. The communication device 1806 may be or include, for example, an Ethernet adapter, cable modem, Wi-Fi adapter, cellular transceiver, Bluetooth transceiver, or the like, or a combination thereof. Depending on the specific nature and purpose of the processing device 1802, the I/O devices 1808 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The technology introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the technology introduced here may be stored on a machine-readable storage medium, e.g., a non-transient computer readable medium, and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g. read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure. Furthermore, the methods described above can be performed in any order, except to the extent that it may be stated otherwise.

Although the present invention has been described with reference to specific illustrative embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method performed by a computer system for authentication associated with a payment service (PS) system, comprising:
   receiving, at the PS system, an email address submitted by a user via an application running on a mobile computing device, wherein the application is associated with the PS system;
   deciding at the PS system if the received email address corresponds to a user system account associated with the PS system;
   identifying at the PS system the mobile computing device associated with the user system account;
   identifying at the PS system an account state associated with the identified email address;
   causing at the PS system a notification to be transmitted to the mobile computing device based on the identified account state, the notification configured to display, via an application running on the mobile computing device, a request for the user to submit a card verification value (CVV) code that corresponds to a payment account associated with the user system account;
   receiving at the PS system the CVV code from the mobile computing device;
   testing at the PS system if the CVV code corresponds to a payment account associated with the user system account, wherein the testing comprises:
      sending from the PS system an authorization request for a financial transaction to a financial entity that is associated with the payment account, wherein the authorization request includes the CVV code; and
      receiving at the PS system an authorization approval from the financial entity if the CVV code matches the payment account;
   granting at the PS system access for the user, via the mobile computing device, to the user system account in response to the received authorization approval;
   receiving at the PS system, through the accessed user system account, a transaction request from the user for a monetary transaction; and
   responsive to the received transaction request, initiating the monetary transaction from the payment account.

2. The method of claim 1, wherein identifying the account state comprises:
   determining whether there is a password associated with the user system account.

3. The method of claim 1, wherein granting the user access to the user system account comprises granting access to configure account settings of the user system account.

4. A payment service (PS) system comprising:
   a processor; and
   a memory coupled to the processor; the processor configured to:
      receive user input from a user device specifying an addressable handle other than a password;
      determine whether the addressable handle corresponds to a user system account;
      identify a device that corresponds to the user system account;
      send a notification to the device to request a code associated with a user financial account that corresponds to the user system account;
      receive the requested code from the device;
      test if the requested code value corresponds to the user financial account; and
      grant access to the user system account based upon the code test.

5. The PS system of claim 4, wherein the processor is further configured to determine if the user device corresponds to the user system account.

6. The PS system of claim 5, wherein if the user device is determined not to be associated with the user system account, the processor is configured to notify the user of the device.

7. The PS system of claim 4, wherein the user financial account comprises a payment account, and wherein the code comprises a card security code associated with a payment card corresponding to the payment account.

8. The PS system of claim 4, wherein the processor is further configured to determine if the user device is considered to be a primary device associated with the user system account.

9. The PS system of claim 4, wherein the processor is further configured to send an authorization request to a financial entity associated with the payment account to test the code.

10. The PS system of claim 4, wherein the processor is further configured to lock out system access based on the receipt of one or more requested code values that do not correspond to the user financial account.

11. A method of authenticating a log-in for an account associated with a payment system, comprising:
- receiving an addressable handle submitted via a first device;
- identifying an account state associated with the addressable handle, the account state indicating that the addressable handle is associated with a second device registered with the payment system;
- transmitting a notification to the second device based on the account state, the notification including a request for a security code from a user associated with the second device; and
- authenticating the log-in to the account in response to receiving the security code from the user;
- wherein the addressable handle and the security code comprise information other than a password.

12. The method of claim 11, wherein the addressable handle comprises any of an email address, a user name, a phone number, a Facebook ID, a Google+ ID, or any unique identifier to which notifications can be routed.

13. The method of claim 11, wherein the addressable handle is submitted via a website running on the first device.

14. The method of claim 11, wherein the addressable handle is submitted via an application that is associated with the payment system.

15. The method of claim 11, wherein the first device and the second device are the same device.

16. The method of claim 11, wherein the first device and the second device are different devices.

17. The method of claim 11, further comprising: verifying the user by authorizing a financial transaction on a financial account using the received security code.

18. The method of claim 11, wherein the identified account state is further based on the existence of a password associated with the account.

19. The method of claim 11, wherein the account comprises one or more settings that are viewable by the user when the log-in to the account is authenticated.

20. The method of claim 11, wherein the account comprises one or more settings that are controllable by the user when the log-in to the account is authenticated.

21. The method of claim 11, wherein the notification is transmitted to an application running on the second device, wherein the application is associated with the payment system.

22. A non-transient computer readable medium comprising instructions for executing a method for authenticating a log-in for a system, comprising:
- instructions for establishing a first factor of authentication, wherein the first factor is established based on:
  - a first match between a first information value received from a user at a user device, and stored information that is associated with a user account on the system; and
  - an indication that the user is in possession of and has access to the user device;
- instructions for determining an account state based on the first match and the stored information;
- instructions for sending a request for input of a second information value, wherein the request is transmitted to a device that corresponds to the user account;
- instructions for establishing a second factor of authentication, wherein the second factor is established based on a verification of correctness of the second information value; and
- instructions for authenticating the log-in to the system in response to the first factor of authentication and the second factor of authentication;
- wherein the first information value and the second information value comprise information other than a password.

23. The non-transient computer readable medium of claim 22, wherein the first information value comprises user information.

24. The non-transient computer readable medium of claim 23, wherein the user information comprises any of a user email address and a user name.

25. The non-transient computer readable medium of claim 22, wherein the second information value comprises a security code.

26. The non-transient computer readable medium of claim 25, wherein the security code corresponds to a card security code for a financial account.

27. The non-transient computer readable medium of claim 22, further comprising: instructions for sending an authorization request to an external entity to test the correctness of the second information value.

* * * * *